United States Patent [19]
Ito

[11] Patent Number: 5,442,464
[45] Date of Patent: Aug. 15, 1995

[54] IMAGE READING APPARATUS AND METHOD WITH IMPROVED METHOD FOR CORRECTING OUTPUT LEVEL OF PHOTOELECTRIC CONVERSION MEANS

[75] Inventor: Masaaki Ito, Yokohama, Japan

[73] Assignee: Ricoh Company, Ltd., Tokyo, Japan

[21] Appl. No.: 898,198

[22] Filed: Jun. 12, 1992

[30] Foreign Application Priority Data

Jun. 12, 1991 [JP] Japan .................. 3-166117

[51] Int. Cl.6 .................................. H04N 1/04
[52] U.S. Cl. ...................... 358/482; 358/406; 358/461; 358/464
[58] Field of Search ........... 358/406, 445, 460, 461, 358/464, 471, 482, 483, 213.15, 213.16

[56] References Cited

U.S. PATENT DOCUMENTS

| | | | |
|---|---|---|---|
| 4,216,503 | 8/1980 | Wiggins | 358/468 |
| 4,554,583 | 11/1985 | Saitoh et al. | 358/461 |
| 4,578,711 | 3/1986 | White et al. | 358/464 |
| 4,602,291 | 7/1986 | Temes | 358/213.16 |
| 4,723,174 | 2/1988 | Nishikawa et al. | 358/461 |
| 4,803,556 | 2/1989 | Beikirch | 358/475 |
| 4,831,460 | 5/1989 | Yamada | 358/483 |
| 4,907,097 | 3/1990 | Sobue | 358/461 |
| 4,916,549 | 4/1990 | Sekizawa | 358/461 |
| 4,920,428 | 4/1990 | Lin et al. | 358/461 |
| 4,980,776 | 12/1990 | Aosaki et al. | 358/483 |
| 4,989,106 | 1/1991 | Ishima | 358/475 |
| 5,124,810 | 6/1992 | Seto | 358/474 |
| 5,130,788 | 7/1992 | Hirota | 358/461 |
| 5,130,822 | 7/1992 | Nagata et al. | 358/461 |

Primary Examiner—Scott A. Rogers
Assistant Examiner—Thomas L. Stoll
Attorney, Agent, or Firm—Oblon, Spivak, McClelland, Maier & Neustadt

[57] ABSTRACT

A level-controlling-quantity setting apparatus sets a level-controlling-quantity so as to make it correspond to a level of output of a photoelectric conversion device. A level controlling apparatus controls output of the photoelectric conversion device so as to make a level of the output correspond to the level-controlling-quantity. A dark-state-output correction apparatus corrects output of the photoelectric conversion device by means of a dark-state-output, the dark-state-output being obtained by a process such that output of said photoelectric conversion device is controlled by means of said level controlling apparatus with a level-controlling-quantity, the level-controlling-quantity being same as a level-controlling-quantity used during a previous-image-reading-state.

11 Claims, 18 Drawing Sheets

FIG.4

| CONTROL SIGNAL | | | | GAIN |
|---|---|---|---|---|
| P4 | P3 | P2 | P1 | |
| 1 | 1 | 1 | 1 | 1 |
| 1 | 1 | 1 | 0 | 15/14 |
| 1 | 1 | 0 | 1 | 15/13 |
| 1 | 1 | 0 | 0 | 15/12 |
| 1 | 0 | 1 | 1 | 15/11 |
| 1 | 0 | 1 | 0 | 15/10 |
| 1 | 0 | 0 | 1 | 15/9 |
| 1 | 0 | 0 | 0 | 15/8 |
| 0 | 1 | 1 | 1 | 15/7 |
| 0 | 1 | 1 | 0 | 15/6 |
| 0 | 1 | 0 | 1 | 15/5 |
| 0 | 1 | 0 | 0 | 15/4 |
| 0 | 0 | 1 | 1 | 15/3 |
| 0 | 0 | 1 | 0 | 15/2 |
| 0 | 0 | 0 | 1 | 15 |
| 0 | 0 | 0 | 0 | (∞) |

FIG.14

| TUBE SURFACE TEMPERATURE | ILLUMINANCE RATIO |
|---|---|
| $T_0 \sim T_1$ | 0.70 |
| $T_1 \sim T_2$ | 0.90 |
| $T_2 \sim T_3$ | 1.00 |
| $T_3 \sim T_4$ | 0.90 |
| $T_4 \sim T_5$ | 0.80 |
| $T_5 \sim T_6$ | 0.70 |

IMAGE READING APPARATUS AND METHOD WITH IMPROVED METHOD FOR CORRECTING OUTPUT LEVEL OF PHOTOELECTRIC CONVERSION MEANS

BACKGROUND OF THE INVENTION

The present invention relates to an image reading apparatus and method, more particularly to an image reading apparatus and method used for a digital duplicator, a facsimile and so on. In the image reading apparatus, generally speaking, an image drawn on a sheet of paper is read by a scanner, then the read image is reproduced on another sheet of paper. The image is, for example, letters, pictures, and other drawings drawn on a sheet of paper. The image reading apparatus and method has an improved method for correcting a dark-state output level of an array of photoelectric elements provided therein.

A metal halide lamp, a fluorescent lamp, an array of light emitting diodes, and other means, have been used for a light source of a scanner provided in a image reading apparatus. It is necessary in an image reading apparatus to correct errors included in an output signal. The errors are due to the following causes. One of the causes is variation of an illuminance of a light source such as those light sources as mentioned above. Such variation is caused by variation in characteristics of the light source per each product. The variation is caused by change of temperature thereof, due to the aging thereof, and other causes. Another of the causes is variation in attenuation properties of optical devices (attenuation is caused by transmission or reflection of light thereof) per each product. And further cause is variation of sensitivities of photoelectric-conversion-elements per each product.

The analogue-digital conversion is performed on an output signal, which signal is provided from photoelectric-conversion-elements. The analogue-digital conversion is needed to be performed with a large dynamic range so as to perform accurate conversion by the methods of this invention. The above mentioned errors in signal due to the above mentioned causes are needed to be corrected most effectively. From the point of view of the above, methods for obtaining an image signal by means of analogue-digital conversion are roughly categorized into the following 2 methods.

(1) A first method of the 2 methods is that: an illuminance of a light source is controlled so as to set an output level of photoelectric conversion elements to a predetermined level. The output level is obtained at a time when a reference-white-board is read.

(2) A second method of the 2 methods is that: a gain-controlled amplifier is provided for an image processing apparatus so as to set an output level of photoelectric conversion elements to a predetermined level. The output level is obtained at a time when a reference-white-board is read.

In the first method of the above 2 methods, the method of controlling an illuminance, not only does a means for controlling an illuminance of a light source incur a high cost, but also an image-reading-time becomes long. A reason of this long image-reading-time is described below. That is, a process for the controlling of an illuminance takes a lot of time. Therefore, generally speaking, the second method is used. The second method is the method of using a gain-controlled amplifier and other apparatus as needed for correcting the errors by means of signal processing with a predetermined apparatus.

In an image reading apparatus, photoelectric conversion elements have a certain output level even in a dark-state. The dark-state means that no light is applied to the array of photoelectric elements. This certain output level may degrade a stability of an image signal output. Or the output level may degrade a tone-level-resolving ability of the scanner or the image reading apparatus. The image signal output thus needs to be corrected by various methods to prevent the interference. The interference may be caused by the above mentioned certain output level of the photoelectric conversion elements. This correction will be called the 'dark-state-output correction' hereinafter. For example, an output image signal, having a high accuracy, can be obtained in a image reading apparatus by the following construction. That is, the image reading apparatus will have a high tone-level-resolving ability if correction of errors, which errors is included in the output image signal, is performed. This correction is performed at a time when an original image drawn on a sheet of paper is read by the scanner. The dark-state-output correction is performed in the following manner. All output data of an array of photoelectric-conversion-elements are used. Those output data are all pixel-outputs along an array direction (for example, outputs of 5000 pixel elements, that is, 5000 pieces of pixel-outputs). The all pixel-output is obtained at a time when a reference-black-board is read by the scanner. This reading method is used instead of using such method as reading in the dark-state. Then, the all pixel-output are stored in a memory after the data are converted into digital data.

However, the array of photoelectric-conversion-elements cannot provide predetermined output levels respectively corresponding to a white color and a black color under the following condition. The condition is that the reference-white-board and the reference-black-board are successively read by the scanner. A reason, why the predetermined output levels cannot be obtained, is described below. The array of photoelectric elements suffers influences of the other tones located adjacent to the tone to be read. This condition is formed in an arrangement where the reference-white-board and the reference-black-board are located to be adjacent to each other. To prevent the influence of the other tones located to be adjacent to the tone to be read, the following arrangement is needed. That is, a sufficient large distance between both the boards along a direction is to be made. This distance is made to be along a line where the scanner runs when it is reading an original image drawn on a sheet of paper to be read. However this arrangement of the boards causes enlargement of the outer dimensions of the image reading apparatus. This arrangement also causes an increase of time taken for reading of the original image. This time-elongation is caused by an increase in the time taken for a provisional running of the scanner. The provisional running of the scanner is performed to read the both reference boards. This provisional running is performed before the scanner reads the original image. The boards are located so as to be apart from each other a sufficient distance as mentioned above.

To overcome problems such as mentioned above, conventional technology has been disclosed in Japanese Laid-Open Patent No. 62-73869 and Japanese Laid- Open Patent No. 62-235871. In the technology, a reference-black-output-level(output level during the dark state) is obtained. The reference-black-output-level corresponds to the predetermined output level obtained by reading the reference-black-board.

FIG.1 shows a diagrammatic construction of an optical system including a scanner, which scanner is provided in an image reading apparatus. The image reading apparatus accords to technology relating to the present invention.

In the construction shown in FIG.1, light is applied by means of a light source 103 onto an original image drawn on a sheet of paper placed on a contacting glass plate 101. Light reflected on the original image on the sheet of paper is then reflected by a first mirror 104, and then by second and third mirror 105a and 105b respectively. Light is then applied to a lens 106. Light then focuses a CCD (Charge Coupled Device Image Sensor) 107. A scanner comprises the light source 103, the mirrors 104, 105a, and 105b. The scanner reads a reference-white-board 102 before reading the original image on the sheet of paper. This reading of a reference-white-board 102 is performed for the purpose of a shading-correction-process. This shading-correction-process is performed for performing a correction on image-output-signal of the CCD 107 so as to prevent undesired shading being drawn on a duplicated image (if the image reading apparatus is being used for a duplicator). This undesired shading drawn is caused by variation in an illuminance of the light source 103 and other causes.

The CCD 107 comprises a linear array of photoelectric-conversion-elements whose location is indicated in FIG.1 and is oriented perpendicular to the page of FIG.1. The scanner runs along a transverse direction, as in FIG.1. The running of the scanner is performed between a position of the light source 103, the mirrors 104,105a, and 105b drawn by solid line and another position of the light source 103, the mirrors 104, 105a, and 105b drawn by broken line.

FIG.2 shows a simplified block diagram of an image-signal-processing system provided in the above mentioned image reading apparatus. In FIG.2, an output signal provided from the CCD 107 is applied to a sample and hold apparatus (S/H) 203. The output signal provided from the CCD 107 includes reset noise caused by an extracting-electrons-from-CCD process. The reset noise is removed by means of the S/H 203 by sampling an appropriate part of the output signal. A gain-controlled-amplifier (GC AMP) 204 has a construction shown in FIG.3. A gain of the GC AMP 204 can be controlled so as to be '1' through '15' by means of 4 pieces of control signal $P_1$ through $P_4$. In an analogue-digital converter (ADC) 205, an output signal of the GC AMP 204 is converted into digital data having 6-bits. In a subtracter 206, the dark-state-output-correction is performed by subtracting a dark-state-output from an image-reading-output.

The dark-state-output is stored in a memory 207 at a time when the light source 103 is turned off. The dark-state-output comprises all outputs of all photoelectric-conversion-elements of the CCD 107. All these outputs are all pixel-outputs of pixels corresponding to the array of the photoelectric-conversion-elements, which array is located along a line whose direction is perpendicular to the page on which FIG.1 is drawn. The all pixel-output is respectively written into respective addresses of the memory 207. On the other hand, when the light source 103 is turned on, the dark-state-output stored in the memory 207 is read from respective addresses of the memory 207. Each address of the memory 207 corresponds to respective one of the addresses of pixel-output of the CCD 107. The pixel-output corresponds to an original image on a sheet of paper, which original image is illuminated by means of the light source 103.

A peak-detecting-apparatus 208 detects a maximum value from values of the respective outputs of elements of the array of the photoelectric-conversion-elements, which array comprises the CCD 107. The peak-detecting-apparatus 208, in a normal state, provides the values (1, 1, 1, 0) as $P_1$ through $P_4$ respectively to the GC AMP 204. A gain of the GC AMP 204 is set by means of these values so as to be a reference gain.

FIG.4 shows a table for a use of obtaining a gain of the apparatus shown in FIG.3. The gain value is set by control signals $P_1$ through $P_4$, which respectively control open-close-operations of switches $SW_1$ through $SW_4$. This control is performed so that: the switch is opened if value '0' of the control signal is applied thereto; and the switch is closed if value '1' of the control signal is applied thereto. In the table of FIG.4, values '1' or '0', indicated in the 4 lefthand columns of the table, respectively show values of the signal $P_1$ through $P_4$. And values, indicated in the righthand large column of the table, show the gain values. Some of the gain values are expressed as fractions, for example, '15/14' and so on. These gain values are obtained if the switches $SW_1$ through $SW_4$ are controlled as per the control signals $P_1$ through $P_4$ as mentioned above. The values of the control signals $P_1$ through $P_4$ are respective values indicated in the 4 lefthand columns of the table on each line thereof. The gain value is a value indicated in the righthand column of the table in the same line as the above mentioned line.

In the normal state, values of the control signals are (1, 1, 1, 0) as mentioned above. Then, the gain value of the apparatus shown in FIG.3 (the GC AMP 204) becomes '15/14' as per a second line from a top line of the table of FIG.4.

The apparatus 208 provides control signals to the GC AMP 204 soon after the light source 103 is turned on. The control signals have 4-bits. These bits are the most significant 4-bits of a peak-value (having 6-bits provided by means of the ADC 205, which has 6-bit output as mentioned above). This peak value is detected as a result of the scanner reading the reference-white-board 103. The apparatus 208 holds the control signals, which are being applied to the GC AMP 204, until one image-reading-operation is finished. Normally, this one image-reading-operation means that the scanner scans one sheet of paper, which paper had been drawn an original image.

For example, if the peak value is obtained in the apparatus 208, assumed as a value '42', in the decimal system('1, 0, 1, 0, 1, 0' in the binary system). Then values (1, 0, 1, 0) $P_1$ through $P_4$, as control signals, are provided from the apparatus 208. These (1, 0, 1, 0) are the first 4-bits of the above mentioned (1, 0, 1, 0, 1, 0). Then a gain value of the GC AMP 204 becomes '15/10' as per a sixth line from the top line of the table of FIG.4. The gain value of the GC AMP 204 has been '15/14' as mentioned above, before a process such that the apparatus 208 provides a control signals (1, 0, 1, 0) to the GC AMP 204. The above mentioned peak value '42' has been obtained from an output signal. This signal is obtained as a result of processes, including a process performed by means of the GC AMP 204, which AMP 204 has the gain '15/14'.

After the process, the gain value of the GC AMP 204 is altered to '15/10'. Thus, a peak value now obtained is obtained from an output data, which is obtained as a result of processes, which include a process performed by means of the GC AMP 204. Now the AMP 204 has a gain value of '15/10'. Therefore, the peak value now obtained is obtained by the following expression:

$$\{42 \div (15/14)\} \times (15/10) = 58.8 \tag{1}.$$

This value '58.8' is very near to the value '64'. On the other hand, a value '64' is a maximum value that is able to be expressed by 6 bits in the binary system ($2^6 = 64$). This value '64' is also a maximum value, which value is able to be treated by the ADC 205. The ADC 205 has a 6-bit output as mentioned above. That is, the nearer that a peak value detected by the apparatus 208 becomes to the ADC 205 maximum, the larger that dynamic range usable in the ADC 205 becomes. The ADC 205 can perform an analogue-digital conversion-process in this dynamic range. As a result, the image reading apparatus uses this large dynamic range of the ADC 205 more effectively while scanning an original image on a sheet of paper and then forming a more accurate image-output-signal.

A controller 212 controls respective operation timing of a scanner driving motor(not shown in the drawings) for driving the scanner so as to drive it in the forward or reverse directions or stop it as shown in FIG.5A. Also the controller 212 controls timing of turning on and off of the light source 103 as shown in FIG.5B. The controller 212 also controls timing of sampling and holding of the S/H 203 as shown in FIG.5C. The controller 212 also controls timing of data storing in the memory 207. Also the controller controls a timing of making the peak detecting apparatus 208 deliver the controlling signal. The controller 212 also controls the peak detecting apparatus 208 so as to make it deliver the controlling signal (1, 1, 1, 0) to the GC AMP 204. This controlling signal results in setting the reference gain Go 15/14) thereto as shown in FIG.5D.

FIGS.5A through 5D show operation time charts of the above mentioned first embodiment of an image reading apparatus. In FIG.5D, Gn−1 indicates a gain, at which gain an output-image-signal has been processed by the GC AMP 204 during a last-time-reading-image-state. Go indicates the above mentioned reference gain '15/14' as a result of the control signal ($P_1$, $P_2$, $P_3$, $P_4 = 1, 1, 1, 0$). And Go indicates a gain, in which gain an output-image-signal has been processed by the GC AMP 204 during a present-time-reading-image-state.

The problem of the image reading apparatus is described below. If a peak value, which was obtained from an output-image-signal for a pixel, was '2' in the decimal system, the value '2' was then stored in the memory 207. The output-image-signal is provided by a photoelectric-conversion-element of the CCD 107. The output-image-signal results from processes, which processes includes a process by means of the GC AMP 204. The AMP 204 has the reference gain Go ('15/14') before turning on the light source 103. On the other hand, a gain Gn of the GC AMP 204, during the present-time-image-reading-state, is '15/10'. The gain Gn of GC AMP 204 during the present-time-image-reading-state is not the same as the gain Go during the dark-state. An output-image-signal as a pixel-output, which output is provided from the element of the CCD 107, is processed by the GC AMP 204 in gain Gn during the present-image-reading-state. The gain Gn is different from the gain Gn. The output-image-signal as a pixel-output, which is provided from the element of the CCD 107, is processed by the GC AMP 204 in the gain Go during the dark-state. The output-image-signal, which has been obtained during the dark-state, is used as the above mentioned reference-black-output-level. This reference-black-output-black-level is used for correction of an image-output-signal so as to obtain high stability of an image-output signal and high-tone-level-resolving-ability. The reference-black-output-level is used instead of using a reference-black-board as mentioned above. An image-output-signal processed by means of the GC AMP 204. However, conditions are different between during the present-image-reading-state and during the dark-state due to the difference of gains of the AMP 204. That is, the bases of obtaining an image-output-signal are different for an image-output signal to be corrected and for the above mentioned reference-black-level. The image-output-signal will be corrected by means of the reference-black-output-level. In the condition, it is not possible to obtain the high stability of either image-output-signal or the high-tone-level-resolving-ability. A reason for this is that an accurate correction is performed on a condition that both bases of obtaining output are the same. One of the bases is the basis of obtaining the reference-black-output-level obtained during the dark-state, the reference-black-output-level is used for correction(dark-state-output-correction). Another of the bases is the basis of obtaining an image-output-signal obtained during the image-reading-state to perform the dark-state-output-correction.

To overcome the above mentioned problem, it is necessary to know Go before the present-image-reading-state is started. This gain is used for processing an image-output-signal during the present-image-reading-state. Then, this gain is set on the GC AMP 204 for processing an image-output signal during the dark-state so as to use it to obtain the reference-black-output. Using this gain for obtaining the black-reference-output-level makes it possible to equalize the bases of obtaining the image-output during the dark-state and during the image-reading-state with each other. The situation, where the above mentioned equalizing is not realized, results in a degraded dark-state-output-correction.

However, as mentioned above, the gain Gn cannot be obtained unless the light source 103 is turned on, then, in this example, the peak value '42', in the decimal system, is obtained, then the gain Gn, in this example, Gn being '15/10', is obtained as mentioned above. Also, this turning on of the light source 103 is needed to be performed just before the operation of reading the original image on the sheet of paper in the image reading apparatus. If a certain time elapses before the operation of reading the original image on the sheet of paper, a peak value may change, the peak value being applied by the apparatus 208 to the GC AMP 204 just before the operation of reading the original image, this peak value being, in this example, '42' as mentioned above. This change of the peak value may be due to a change of a condition of the image reading apparatus, for example, change of an illuminance of the light source 103 caused by change of temperature thereof. This change of the peak value, due to time elapsed before the operation of reading the original image, causes the same problem as in the related process of not turning on the light source 103 before the image-reading-state, due to change of gain of the GC AMP 204. The change of gain of the GC AMP 204 means the change of the basis of obtaining the image-output-signal between during the dark-state and during the image-reading-state.

Therefore it is necessary to perform an action such as turning on the light source 103 before the image-reading-state just before the image-reading-state. That is, this action is to be performed after an operator performs an operation on the image reading apparatus so as to make the image reading apparatus start the operation of reading the original image. If the light source 103 is turned on, after this operation being performed by the operator, and also before the image-reading-state, a certain time loss is thus incurred between the time of the operation being performed by the operator and the times of reading the original image in the image reading apparatus. This time loss incurred before reading the original image in an image reading apparatus prevents the satisfaction of a current request of users thereof, the current request being to provide duplicators, facsimiles, etc. having a higher processing speed.

SUMMARY OF THE INVENTION

Accordingly, it is a general object of the present invention to provide an improved image reading apparatus and method wherein the above mentioned problems of the related apparatus are eliminated.

Another and more specific object of the present invention is to provide an image reading apparatus and method wherein the dark-state-output correction can be performed accurately so as to obtain a high stability of a image-output-signal and the high-tone-level-resolving-ability, without increasing the processing time required to process a predetermined operation necessary for reading an original image and then forming a duplicated image of the original image or transmitting the image-signal of the original image and other processes with respect to the original image.

To achieve the above specific object of the present invention, an image reading apparatus and method comprises:

a light source for applying light onto an original image;

photoelectric conversion means or step for converting light reflected from the original image into an electric signal and for providing the electric signal;

level-controlling-quantity setting means or step for setting a level-controlling-quantity so as to make the level-controlling-quantity correspond to an electric signal provided from the photoelectric conversion means;

level controlling means or step for controlling an electric signal provided from the photoelectric conversion means so as to make a level of the electric signal correspond to the level-controlling-quantity;

dark-state-output correction means or step for correcting output of the photoelectric conversion means by means of a dark-state-output; and controlling means or step for obtaining the dark-state-output by a process such that an output of the photoelectric conversion means is obtained during a dark-state, during the dark-state, wherein there is almost no light being applied to the photoelectric conversion means, the output of the photoelectric conversion means is controlled by means of the level controlling means with a level-controlling-quantity, the level-controlling-quantity being the same as a level-controlling-quantity used during a previous-image-reading-state.

In the above mentioned construction, the dark-state-output correction can be performed accurately if a condition of the image reading apparatus may not be changed between the following situations. The first one of the situations is that where a level-controlling-quantity is obtained during a previous-image-reading-state. This level-controlling-quantity is used for controling a level of a dark-state-output. This dark-state-output is obtained for the dark-state. The dark-state-output is used for correcting an output of the photoelectric conversion means during a present-image-reading-state. The second one of the situations is that where another level-controlling-quantity is obtained during the present-image-reading-state. The other level-controlling-quantity is used for controlling an output-level of the photoelectric conversion means during the present-image-reading-state. Also an output, which is obtained as a result of performing the above mentioned level-control, is then applied a dark-state-output-correction. The dark-state-output-correction is performed by means of the dark-state-output correction means with the dark-state-output obtained by the above mentioned process during the dark-state in the above mentioned condition of the first situation.

The above mentioned conditions of the first and second situations in the image reading apparatus is, for example, an illuminance of the light source. The illuminance changes easily due to a temperature of the light source as mentioned above. An image-reading-output is then performed the dark-state-output correction by means of a dark-state-output. The image-reading-output is obtained as a result of reading an object and then as a result of magnifying by a gain. The dark-state-output is obtained as a result of reading the dark-state and then as a result of magnifying by another gain. In the other words, the basis of obtaining the image-reading-output to be corrected and the basis of obtaining another dark-state-output to be used for the correction are different from each other.

Thus, if the above mentioned difference between the bases of obtaining output is prevented, it will be possible to obtain high stability of an image-output-signal and high-tone-level-resolving-ability, without increasing the processing time required to process the predetermined operations.

However, if a certain time elapses between the following two states, a difference between the bases occurs. One of the states is where a level-controlling-quantity required for obtaining a dark-state-output is determined. This state is included in a previous-time-image-reading-state. The other of the states is where another level-controlling-quantity required for obtaining an image-reading-output is determined. The other state is included in the present-time-image-reading-state, A further specific object of the present invention is to provide an image reading apparatus and method wherein an accurate dark-state-output correction is performed with a dark-state-output. The dark-state-output is obtained as a result of a process. This process is the same process as another process. The other process is performed on an image-reading-output. The image-reading-output is to be corrected by a dark-state-output-correction, this correction being performed by using a dark-state-output. The above mentioned accurate dark-state-output-correction should be performed, even if a certain time elapses between the following two states. One of the states is that included in a present-image-reading-state and another of the states is that included in a previous-image-reading-state. The elapsed time is so long as to result in a difference in the basis for obtaining output.

To achieve the above mentioned further specific object of the present invention, the image reading apparatus and method further comprises:

image-reading-condition detecting means for detecting an image-reading-condition of said image reading apparatus;

dark-state-output correction means for correcting output of the photoelectric conversion means by means of the dark-state-output; and controlling means for forecasting a level-controlling-quantity used for obtaining a dark-state-output, forecasting being performed by means of converting an output of the image-reading-condition detecting means into a corresponding level-controlling-quantity by means of a predetermined function; the controlling means also obtaining the dark-state-output by a process such that an output of the photoelectric conversion means is obtained during a dark-state, wherein the dark-state almost no light is applied to the photoelectric conversion means, the output of the photoelectric conversion means is controlled by means of the level controlling means with a level-controlling-quantity, the level-controlling-quantity being obtained by forecasting.

In the above mentioned construction, a level-controlling-quantity during any state of the image reading apparatus is obtained without turning on the light source. Thus, an accurate dark-state-output correction can be performed by means of a dark-state-output. The dark-state-output can be obtained as a result of a process. This process is performed by means of an forecasted level-controlling-quantity. This process should be the same as another process, which another process is performed on an image-reading-output. A reason for this is that the other process is performed by means of another level-controlling-quantity. The above mentioned forecasted level-controlling-quantity is forecasted so as to become the same as the other level-controlling-quantity.

The reading-condition detecting means detects, for example, a temperature of surface of the light source. An illuminance of the light source depends on a temperature of surface thereof. And an output of the photoelectric conversion means depends on the illuminance of the light source. On the other hand, the level-controlling-quantity depends on the output of the photoelectric conversion means. Thus the level-controlling-quantity depends on the temperature of the surface of the light source. Thus, the level-controlling-quantity will be forecasted by the temperature of the surface of the light source by means of the level-controlling-quantity forecasting means. The forecasting means has, for example, a conversion table for converting a temperature of the surface of the light source into a level-controlling-quantity. This converting table has been formed by actual tests. This actual tests were performed previously on the image reading apparatus for obtaining the relationship between temperatures of the surface of the light source and level-controlling-quantities.

However, it may be that the above mentioned predetermined function, which function indicates a relationship between an output of the reading condition detecting means and a level-controlling-quantity, becomes different from an actual function of the image reading system. The level-controlling-quantity will be provided by means of the level-controlling-quantity setting means. The level-controlling-quantity will be forecasted by the predetermined function before the provision by means of the level-controlling-quantity setting means. The above mentioned difference is due to change of characteristics of the image reading system. This change is caused by a elapsing time. The difference is, for example, that of a relationship between temperatures and illuminance of the light source, which relationship differs from an original one at a time the light source having been new.

In the above mentioned condition, that is, the actual function of the image reading apparatus being different from the original one, forecasting in the level-controlling-quantity forecasting means cannot be performed accurately, this resulting in the above mentioned problem caused by a difference of bases for obtaining of output between an image-reading-output to be corrected and an dark-state output used for correcting the image-reading-output.

A further more specific object of the present invention is to provide an image reading apparatus and method wherein an accurate dark-state-output correction can be performed even if the above mentioned actual function of the image reading apparatus differs from an original one.

To achieve the further more specific object of the present invention, the image reading apparatus and method having the construction mentioned above but also having the following construction. That is, the controlling means forecasts a level-controlling-quantity of a present-image-reading-state during the dark-state. This forecasting is performed by means of converting an output of the image-reading-condition detecting means into corresponding level-controlling-quantity. This conversion is performed by means of a predetermined function. The controlling means also obtains the dark-state-output by the following process, That is, an output of the photoelectric conversion means is obtained during a dark-state. Almost no light being applied to the photoelectric conversion means during the dark-state. The output of the photoelectric conversion means is controlled by means of the level controlling means with a level-controlling-quantity. The level-controlling-quantity is obtained by the following respective manners per each of the following cases. The level-controlling-quantity is forecasted, in one case where a single-independent-image-reading-operation or a first-time-image-reading-operation of a successive plurality of image-reading-operations is performed. The level-controlling-quantity is to be the same as a level-controlling-quantity used at a previous-time-image-reading-operation, in another case where second-time or later-time image-reading-operation of the successive plurality of image-reading-operation is performed.

In the above construction, an accurate dark-state-output correction will be performed in a second or later time image-reading-state, the correction being performed by means of a new level-controlling-quantity obtained by a first-time-image-reading-state if a successive plurality of image-reading operations are performed. Even if the actual function of the image reading apparatus becomes different from an original one, there is a function possessed by the level-controlling-quantity forecasting means corresponding to the original function, and the new level-controlling-quantity is obtained based on an actual output of the photoelectric conversion means during the first-time-image-reading-state. Here, a elapsed time between successive image-reading-states is sufficiently short. Thus an image-reading-condition of the image reading system, for example, an illuminance of the light source do not differ during the time. Thus, a level-controlling-quantity is almost the same as another level-controlling-quantity, which another level-controlling-quantity will be obtained and will be used for processing output during a next-time-image-reading-state.

Other objects, features and advantages of the present invention will become more apparent from the following detailed description when read in conjunction with the accompanying drawings in which.

BRIEF DESCRIPTION OF THE DRAWINGS

FIG.4 shows a table indicating a relationship between gains and controlling signals given to the gain controlled amplifier shown in FIG.3;

FIG.14 shows a table corresponding to the graph shown in FIG.13;

DESCRIPTION OF THE PREFERRED EMBODIMENT

Figure 1:
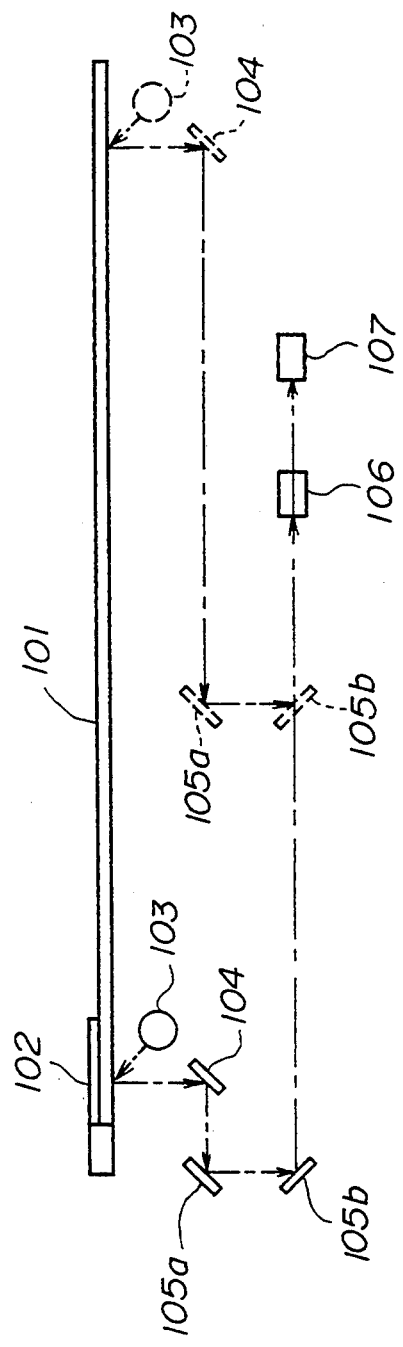
FIG.1 shows a simplified composition of a optical system of a image reading apparatus according to the present invention.

In description of the embodiments of the image reading apparatus according to the present invention in conjunction with the drawings, a description of parts corresponding to the parts shown in FIGS.1 through 3 will be omitted and the same numerals given to the parts in FIGS.1 through 3 will be given to the corresponding parts in the drawings to be described below.

Figure 6:
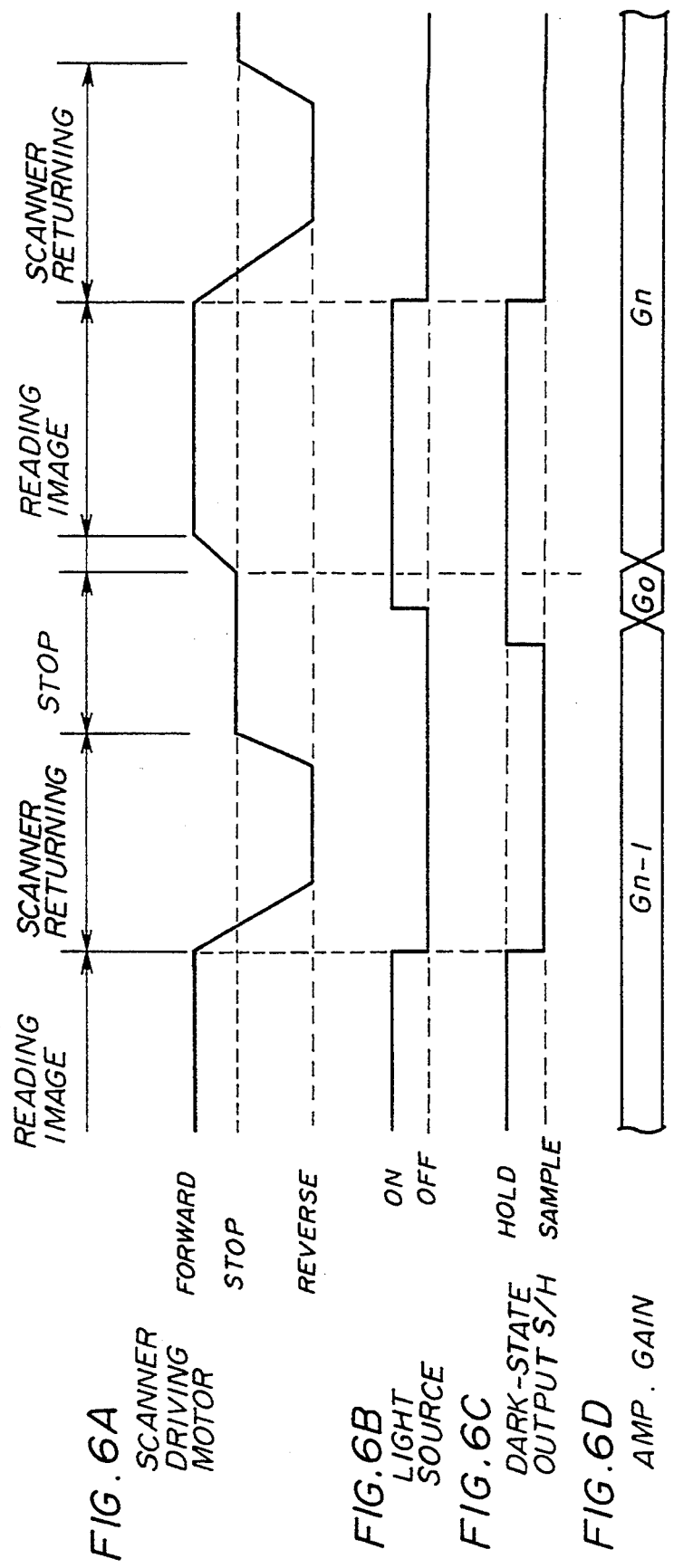
FIGS.6A through 6D respectively show operating timing charts of a first embodiment of a image reading apparatus according to the present invention.

Firstly, a first embodiment of the image reading apparatus according to the present invention having almost the same composition as the apparatus shown in FIG.2 will be described below. However, a controller 213 controls operation timing of: a scanner driving motor(-not shown in the drawings) for driving the scanner so as to drive it in the forward or reverse directions or stop it as shown in FIG.6A; turning on and off of the light source 103 as shown in FIG.6B; sampling and holding of the S/H 203 as shown in FIG.6C; storing data in the memory 207; and making the peak detecting apparatus 208 deliver a controlling signal. The controller 212 also controls the peak detecting apparatus 208 so as to make it deliver the controlling signal (1, 1, 1, 0) to the GC AMP 204 so as to set the reference gain Go (15/14) thereto as shown in FIG.6D.

Figure 2:
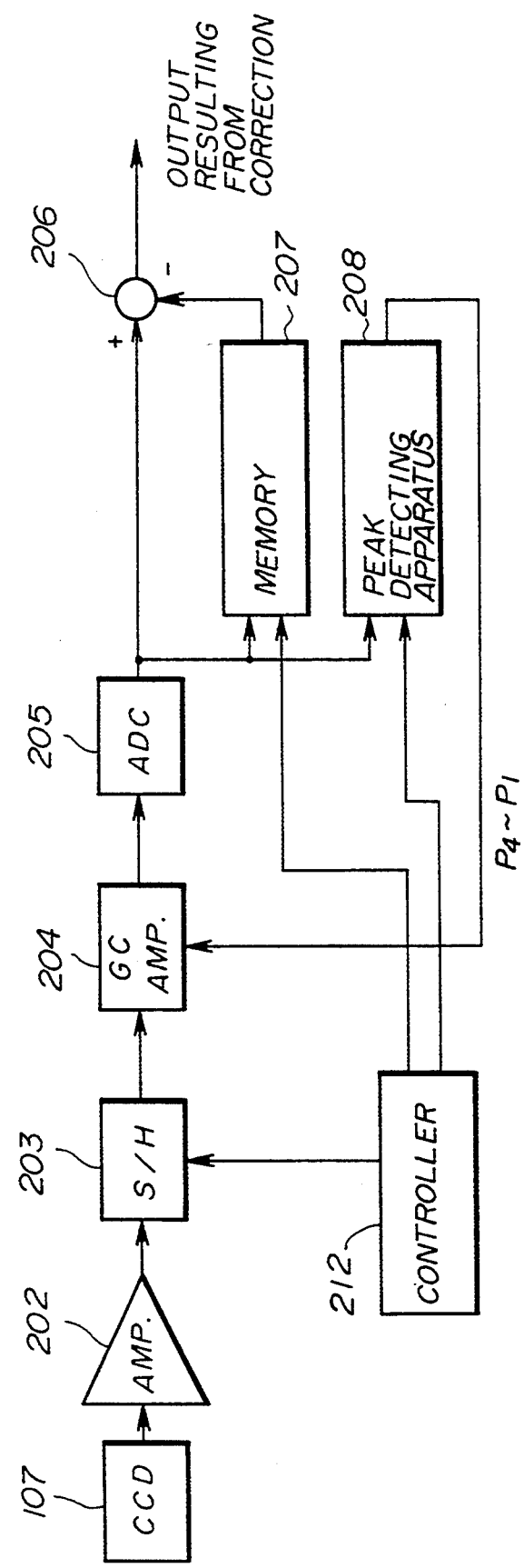
FIG.2 shows a simplified block diagram of image signal processing system of a first embodiment of a image reading apparatus according to the present invention.
Figure 3:
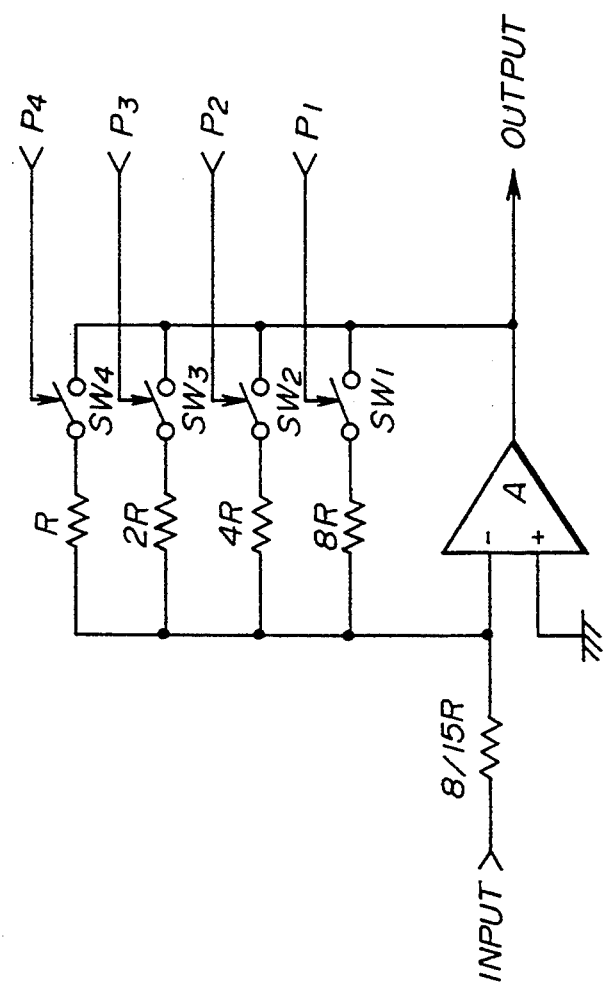
FIG.3 shows a composition of a gain controlled amplifier used for an image reading apparatus according to the present invention.

In the embodiment, which has a composition shown in FIG.2, a gain has been used for processing an output of the CCD 107 during a previous-image-reading-state. Then this gain will also be used as a gain of the GC AMP 204 for processing output of the CCD 107 during a dark-state. This output of the CCD 107 during a dark-state is used instead of using the reference gain Go, which gain Go is used for a gain-correction-operation by means of reading the reference-white-board 102. The illuminance of the light source 103 may be, generally speaking, unstable over a long time and the illuminance depends on a temperature thereof (particularly in a fluorescent lamp). However, the above mentioned is effective because an illuminance of the light source 107 is almost stable during an image-reading-state having a relatively short duration.

A fluctuation of an illumination of the light source 103 is slow in contrast to a speed of an image-reading-action of the scanner. Thus, change of the gain controlling signals $P_1$ through $P_4$ due to the fluctuation of the illumination is relatively small. For example, the gain controlling signals obtained during a present-image-reading-state are the following values:

$P_1$ through $P_4$=(1, 0, 1, 0).

The values (1, 0, 1, 0) in the binary system are '10' in the decimal system. A difference between a gain controlling signal obtained during a previous-image-reading-state and during the present-image-reading-state is not more than '1' in the decimal system. The gain controlling signal obtained during the previous-image-reading-state should be thus, for example, '9' in the decimal system, this value '9' corresponding to (1, 0, 0, 1) in the binary system.

It is assumed that a dark-state-output is '2' in the decimal system. The output '2' is obtained as a result of being amplified by the GC AMP 204. And a gain of the GC AMP 204 is the above mentioned reference gain Go. The gain Go is, in the above mentioned example, '15/14'. In the above assumption, as a result of being amplified by GC AMP 204, a gain Gn−1 of which has been controlled by the gain controlling signal '9'(1, 0, 0, 1). This signal has been obtained during the previous-image-reading-state as mentioned above. The gain Gn−1 is, with reference to the table in FIG.4, '15/9'. A dark-state-output is thus obtained by the following expression:

$$\{2+(15/14)\} \times (15/9) \approx 3 \qquad (2).$$

FIGS.6A through 6D respectively show timing charts with respect to the first embodiment of the image reading apparatus. A gain Gn of GC AMP 204, controlled by a controlling signal '10'(1, 0, 1, 0) obtained during the present-image-reading-state as mentioned above, is, with reference to the table in FIG.4, '15/10'. Thus, a dark-state-output, which should be obtained as a result of being amplified by the GC AMP 204 with the gain Gn '15/10', is yielded from the following expression:

$$\{2 \div (15/14)\} \times (15/10) \approx 3 \qquad (3).$$

The result approximately '3' of the expression (3) is almost same as the result approximately '3' of the expression (2). A reason for this is that the difference of gains of the GC AMP 204 (the GC AMP 204 amplifying output of the CCD 107 with the gain) is sufficiently small so as to be negligible. This difference is that between the gain Gn−1 '15/9' (used for obtaining a dark-state-output, in the example, according to the first embodiment of the present invention as shown in the timing chart in FIGS.6A through 6D) and the gain Gn−1 '15/10' (used for obtaining image-output during the present-image-reading-state).

Figure 5:
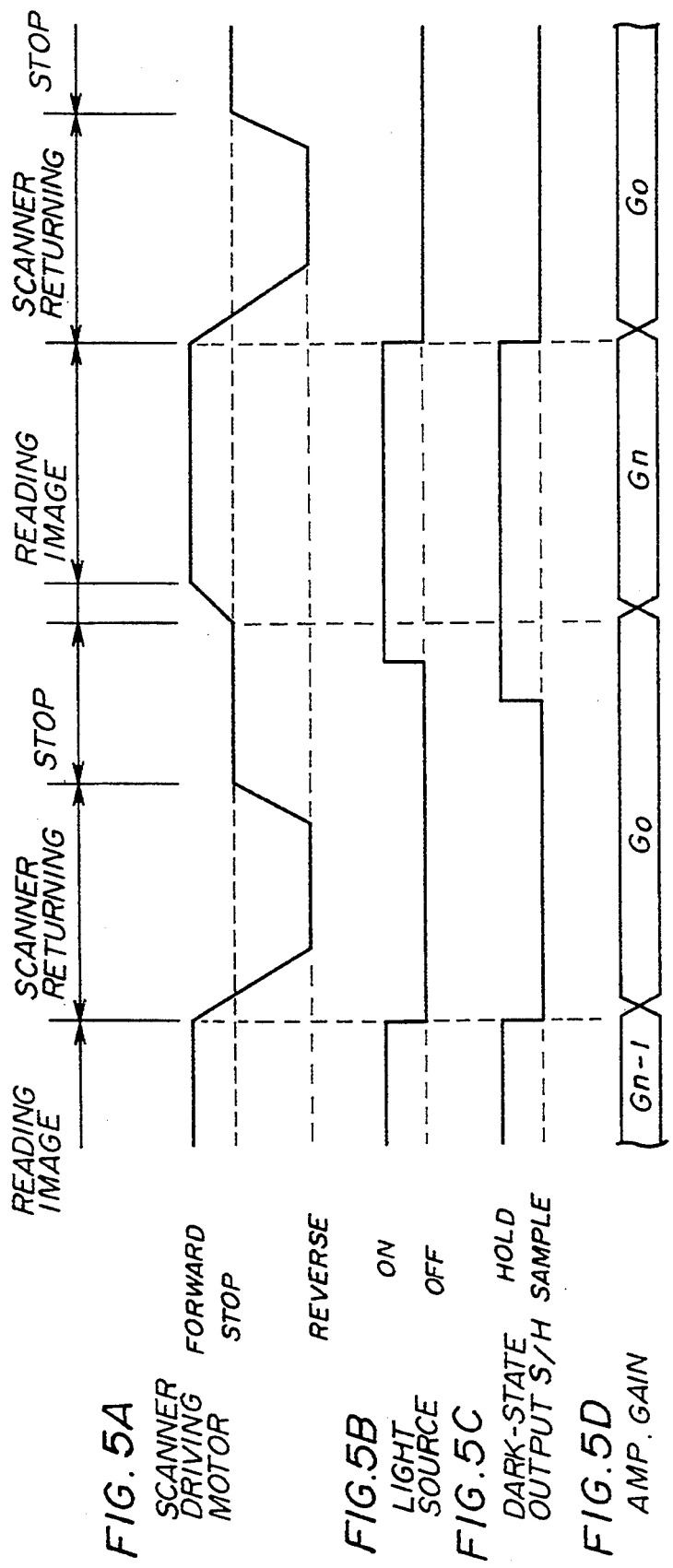
FIGS.5A through 5D respectively show operating timing charts of a image reading apparatus relating to the present invention.

On the other hand, if the reference gain Go is used for obtaining a dark-state-output, the dark-state-output, as a result of being amplified by the GC AMP 204, which possesses the reference gain Go, is '2' in the decimal system as mentioned above. This method is according to the example of the image reading apparatus relating to the present invention. This example is mentioned above in conjunction with the timing charts in FIGS.5A through 5D. This value '2' is largely different from the result approximately '3' of the expression (3). This difference is due to the difference of gains of the GC AMP 204. The GC AMP 204 amplifies an output of the CCD 107 with the gain. This difference is, concretely for the above mentioned assumption, that between the following two gain values. One of the gain values is Go '15/14' (the reference gain), which is used for obtaining a dark-state-output in the example according to the timing chart in FIG.5D. The other gain is Gn '15/10', which is used for obtaining image-output during the present-image-reading-state.

In the first embodiment as mentioned above, GC AMP 204 in FIG.2 is used for level-controlling. That is, the AMP 204 is used for controlling an output of the CCD 107 so as to make the output have a proper level. This level-controlling is performed for the purpose of using a larger dynamic range of the ADC 205 during converting the signal as mentioned above. However, other methods for level-controlling such as mentioned above are possible to realize the same function as the above mentioned first embodiment.

One of the methods is that giving a conversion-reference-voltage to the ADC 205. This method is that of a second embodiment of the image reading apparatus according to the present invention. This conversion-reference-voltage is obtained from an output of the peak detecting apparatus 208. This output is a digital signal, which is converted into analogue signal by means of a digital-analogue converter. Another of the methods (that is of a third embodiment of the image reading apparatus according to the present invention) is to control a light-storing-time of the CCD 107. This controlling of a light-storing-time is performed by means of a signal obtained from a pulse generator 210. The pulse generator generates a pulse, which corresponds to an output-level obtained from the peak detecting apparatus 208.

Figure 7:
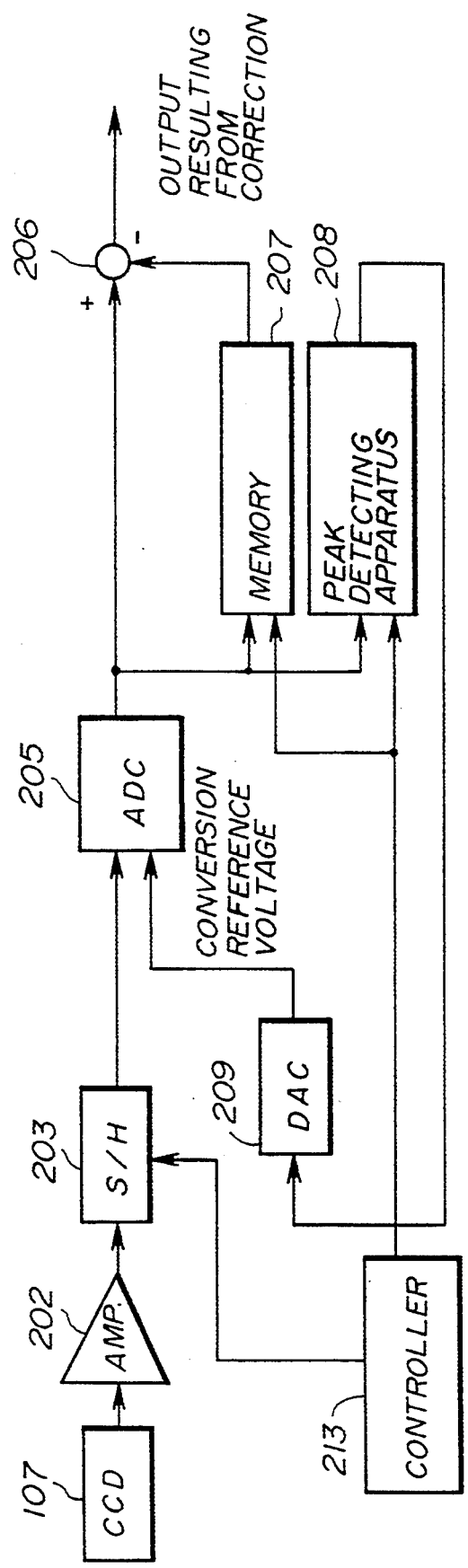
FIG.7 shows a simplified block diagram of image signal processing system of a second embodiment of an image reading apparatus according to the present invention.
Figure 8:
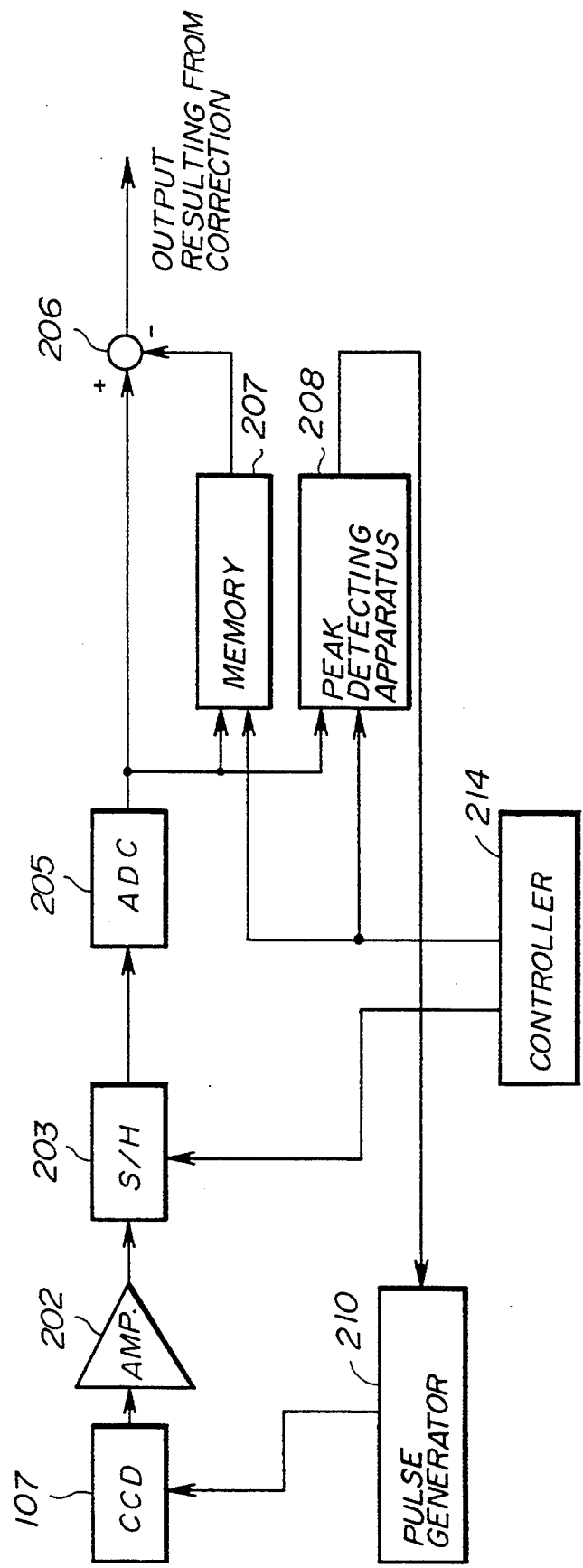
FIG.8 shows a simplified block diagram of image signal processing system of a third embodiment of an image reading apparatus according to the present invention.

FIGS.7, and 8 show simplified block diagrams for image processing systems corresponding respectively to the above mentioned methods of the second and third embodiments.

In FIG.7, output of the peak detecting apparatus 208 is provided to the digital-analogue converter(DAC) 209 to convert the output into an analogue signal, so as to apply the analogue signal to the ADC 205 as a conversion-reference-voltage. Then, the following two kinds of constructions may be realized, One of them is that a result of dividing output of the S/H 203 by the conversion-reference-voltage, which is applied by the DAC, is converted into a digital signal. The digital signal corresponds to the result of the above mentioned division. The other of the two kinds of the constructions is that a result of subtracting the conversion-reference-voltage, which is provided from the DAC output of the S/H 203, is converted into a digital signal. This digital signal corresponds to the result of above mentioned subtraction. Thus, the above mentioned results, whose values correspond to an input voltage to the ADC 205, are controlled in the following manner. The input voltage to the ADC 205 is reduced due to minimization of the result of the above mentioned division or subtraction, if the output of the S/H 203 is large. The input voltage of the ADC 205 is enlarged due to enlargement of the result, if the output of the S/H 203 is small. Thus, substantially the same function will be obtained in the construction of the second embodiment shown in FIG.7, as that of first embodiment having the GC AMP 204 shown in FIG.2.

A controller 213 controls respective operation timing of: a scanner driving motor (not shown in the drawings) for driving the scanner so as to drive it in the forward or reverse directions or stop it as shown in FIG.6A; turning on and off the light source 103 as shown in FIG.6B; sampling and holding by the S/H 203 as shown in FIG.6C; storing of data in the memory 207; and making the peak detecting apparatus 208 deliver a controlling signal, 'AMP. GAIN' in FIG.6D should be replaced by 'CONVERSION REFERENCE VOLTAGE'. Also gains 'Gn−1', 'Go', and 'Gn' in FIG.6D should be replaced by corresponding conversion reference voltages 'Vn−1', 'Vo', and 'Vn' respectively, The controller 212 also controls the peak detecting apparatus 208 so as to make it deliver the controlling signal to the DAC 209 so as to make it deliver a reference conversion reference voltage Vo (corresponding to the reference gain Go (15/14) in the first embodiment) to the ADC 205 as shown in FIG.6D. 'AMP. GAIN' in FIG.6D should be replaced by 'REFERENCE LEVEL'. Also gains 'Gn−1', 'Go', and 'Gn' in FIG.6D should be replaced by corresponding conversion reference voltages 'Vn−1', 'Vo', and 'Vn' respectively.

With regard to the apparatus shown in FIG.7, a function of level-controlling a signal level applied to the ADC 205 will be described below, in a manner such as to indicate an example applying actual values to variables.

Firstly, it is assumed that the ADC 205 can provide 8-bits of digital signal so as to provide values '0' through '255' in the decimal system. Also it is assumed that the DAC 209 can treat 8-bits of digital signal ('0' through '255' in the decimal system) applied thereto. Also it is assumed that the DAC 209 provides an output in voltage '0' through '2.55' volts(corresponding to '0' to '255' input data respectively) to the ADC 205. It is also assumed that a peak level of a signal provided by the S/H 203 is '1' volt.

Then, output of the peak detecting apparatus 208 is controlled by the controller 213 so as to provide a controlling signal of '255' in the decimal system to the DAC 209 irrespective of the output of the ADC 205. Thus, DAC 209 provides '2.55' volts to the ADC 205 as the reference conversion reference voltage Vo. A peak of the output of the ADC 205 thus becomes:

$$\text{output of } ADC = \frac{\text{input(output of } S/H)}{\text{conversion reference voltage } V_0} \times 255$$
$$= \frac{1.0(V)}{2.55(V)} \times 255 = 100 \text{ (in decimal system)}.$$

Then this output of '100' in the decimal system is detected by a peak detecting apparatus 208, the apparatus 208 being then controlled by the controller 213 so as to fix the output thereof at '100'. Then the output of the DAC 209 becomes:

$$2.55(V) \times \frac{100}{255} = 1.0(V).$$

Then a peak of output of the ADC 205 becomes:

$$\text{output of } ADC = \frac{\text{input(output of } S/H)}{\text{conversion reference voltage } V_n} \times 255$$
$$= \frac{1.0(V)}{1.0(V)} \times 255 = 255 \text{ (in decimal system)}.$$

Thus output of the ADC 205 becomes a maximum value of '255' in the decimal system, this meaning that a maximum dynamic range of the ADC 205 can be used.

In FIG.8, an output of the peak detecting apparatus 208 is applied to the pulse generator 210. An output of the pulse generator 210 is then applied to the CCD 107 so as to control a light-storing-time thereof. This control of the light-storing-time of the CCD 107 is performed in the following manner. That is, the light-storing-time is shortened and an output level of the CCD 107 is thus reduced, if output of the peak detecting apparatus 208 is large. If the light-storing-time is elongated, an output level of the CCD 107 is thus enlarged if output of the peak detecting apparatus 208 is small. Thus, substantially the same function will be obtained in the construction of the second embodiment shown in FIG.8, as that of first embodiment having the GC AMP 204 shown in FIG.2.

A controller 214 controls respective operation timing of: a scanner driving motor (not shown in the drawings) for driving the scanner so as to drive it in the forward or reverse directions or stop it as shown in FIG.6A; turning on and off of the light source 103 as shown in FIG.6B; sampling and holding by the S/H 203 as shown in FIG.6C; storing of data in the memory 207; and making the peak detecting apparatus 208 deliver a controlling signal. 'AMP. GAIN' in FIG.6D should be replaced by 'LIGHT STORING TIME'. Also gains 'Gn−1', 'Go', and 'Gn' in FIG.6D should be replaced by corresponding light storing times 'Tn−1', 'To', and 'Tn' respectively. The controller 212 also controls the peak detecting apparatus 208 so as to make it deliver the controlling signal to the pulse generator 210 so as to make it to deliver a reference light-storing-time-controlling-signal to the CCD 107 to make a light-storing-time of the CCD 107 become To (corresponding to the reference gain Go (15/14) in the first embodiment ) as shown in FIG.6D. 'AMP. GAIN' in FIG.6D should be replaced by 'LIGHT STORING TIME'. Also gains 'Gn−1', 'Go', and 'Gn' in FIG. 6D should be replaced by corresponding light storing time 'Tn−1', 'To', and 'Tn' respectively.

With regard to the apparatus shown in FIG.8, a function of level-controlling of an signal-level which is applied to the ADC 205, will be described below in a manner such as to indicate an example applying actual values to variables.

Firstly, it is assumed that the ADC 205 can provide 8-bits of digital signal so as to provide values '0' through '255' in the decimal system. Also it is assumed that the pulse generator 210 can treat 8-bits of digital signal ('0' through '255' in the decimal system ) applied thereto. Also it is assumed that the generator 210 provides an output pulsed at from '0' through '2550' Hz (corresponding to '0' to '255' input data respectively) to the CCD 107. Output level of the CCD 107 is in proportion to illuminance given thereto and light-storing-time thereof. The light-storing-time is in proportion to a reciprocal of a value of frequency of a pulse applied thereto from the generator 210. Thus, light-storing-times of the CCD 107 '1' through '1/255' seconds correspond to frequencies of pulses applied to the CCD 107 '1' through '2550' Hz respectively. It is also assumed that a peak level of signal provided by the S/H 203 is '1' volt, and a conversion reference voltage for the ADC 205 is fixed to 2.55 volts.

Then, output of the peak detecting apparatus 208 is controlled by the controller 214 so as to provide a controlling signal '255' in the decimal system to the DAC 209 irrespective of the output of the ADC 205. Thus, the generator 210 provides '2550' Hz to the CCD 107 so as to make a light-storing-time of the CCD 107 become the reference-light-storing-time To (=1/2550 seconds). A peak of output of the ADC 205 thus becomes:

$$\text{output of } ADC = \frac{\text{input(output of } S/H)}{\text{conversion reference voltage } V_0} \times 255$$

-continued $$= \frac{1.0(V)}{2.55(V)} \times 255 = 100 \text{ (in decimal system)}.$$

Then this output '100' in the decimal system is detected by a peak detecting apparatus 208, the apparatus 208 being then controlled by the controller 213 so as to fix the output thereof to '100'. Then the output of the generator 210 becomes:

$$2550(Hz) \times \frac{100}{255} = 1000(Hz).$$

Then a peak of output voltage of S/H 203 becomes:

$$1.0(V) = \frac{1/1000(sec.)}{1/2550(sec.)} = 2.55(V).$$

Then a peak of output of the ADC 205 becomes:

$$\text{output of } ADC = \frac{\text{input(output of } S/H)}{\text{conversion reference voltage } V_n} \times 255$$

$$= \frac{2.55(V)}{2.55(V)} \times 255 = 255 \text{ (in decimal system)}.$$

Thus output of the ADC 205 becomes maximum value '255' in the decimal system, this meaning that a maximum dynamic range of the ADC 205 can be used.

Next, a fourth embodiment of an image reading apparatus according to the present invention will be described below in conjunction with FIG.9. This embodiment is effective with the apparatus wherein an illuminance of a light source depends on temperature of the light source.

With respect to a light source used in a image reading apparatus, particularly a fluorescent lamp, an illuminance of the lamp depends on tube-temperature of the lamp. Thus, in the fourth embodiment, an illuminance of a light source during an image-reading-state is forecasted. This forecasting is performed before turning on the light source. The forecasting is performed by means of a conversion table. This conversion table has been made by means of obtaining illuminance-ratios from tube-temperatures of the light source and illuminance data thereof. This illuminance data has been obtained in actual measurement in conditions of variable tube-temperatures thereof. Thus, a gain of a GC AMP 204 in FIG.9 is set based on the forecasted illuminance data by means of the above mentioned method. Then a dark-state-output will be obtained. The dark-state-output is obtained as a result of being amplified by the GC AMP 204 possessing the gain determined based on the forecast data.

Figure 12:
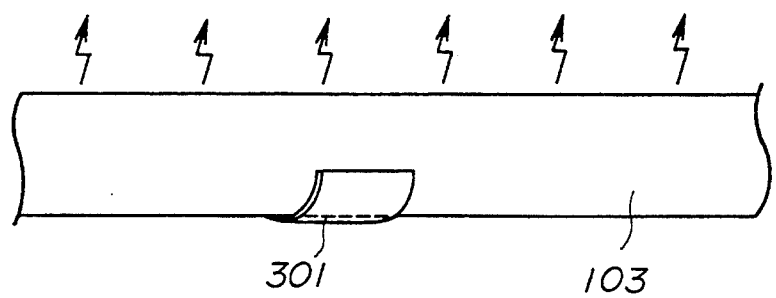
FIG.12 shows an appearance of essential part of a fluorescent lamp used as a light source of an image reading apparatus according to the present invention.
Figure 13:
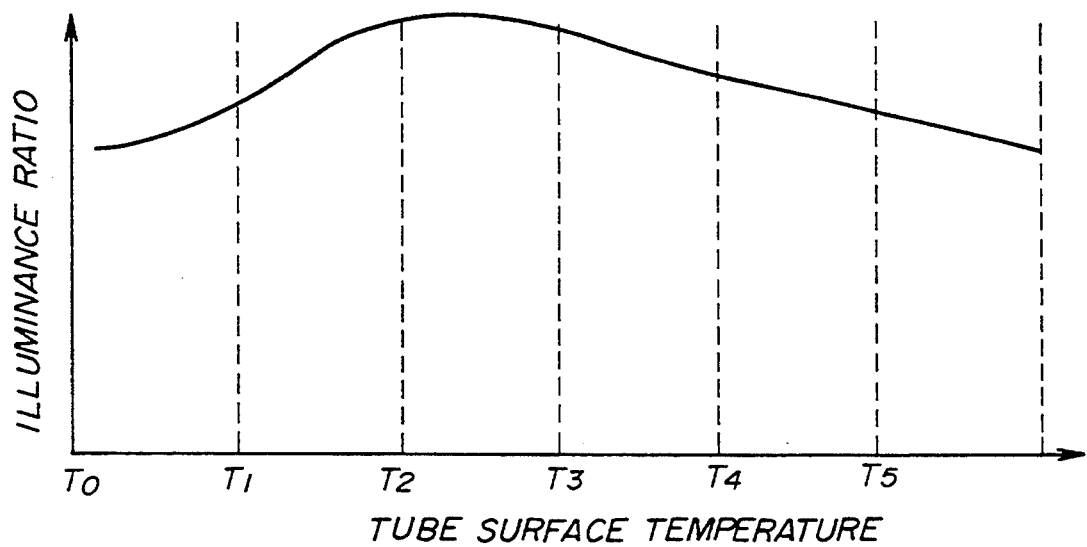
FIG.13 shows a graph of characteristics of a relationship between tube-temperatures and illuminance-ratios of a lamp shown in FIG.12.

FIG.12 shows an appearance of an essential part of the light source 103. In the light source 103 shown in FIG.12, a temperature detector 301 (comprising, for example, a thermistor or a thermocouple) is located on a portion of the light source 103. This position is such that light path from the light source 103 to an original image to be read is not disturbed by the temperature detector 301. The temperature detector 301 monitors a tube-temperature of the light source 103.

Figure 9:
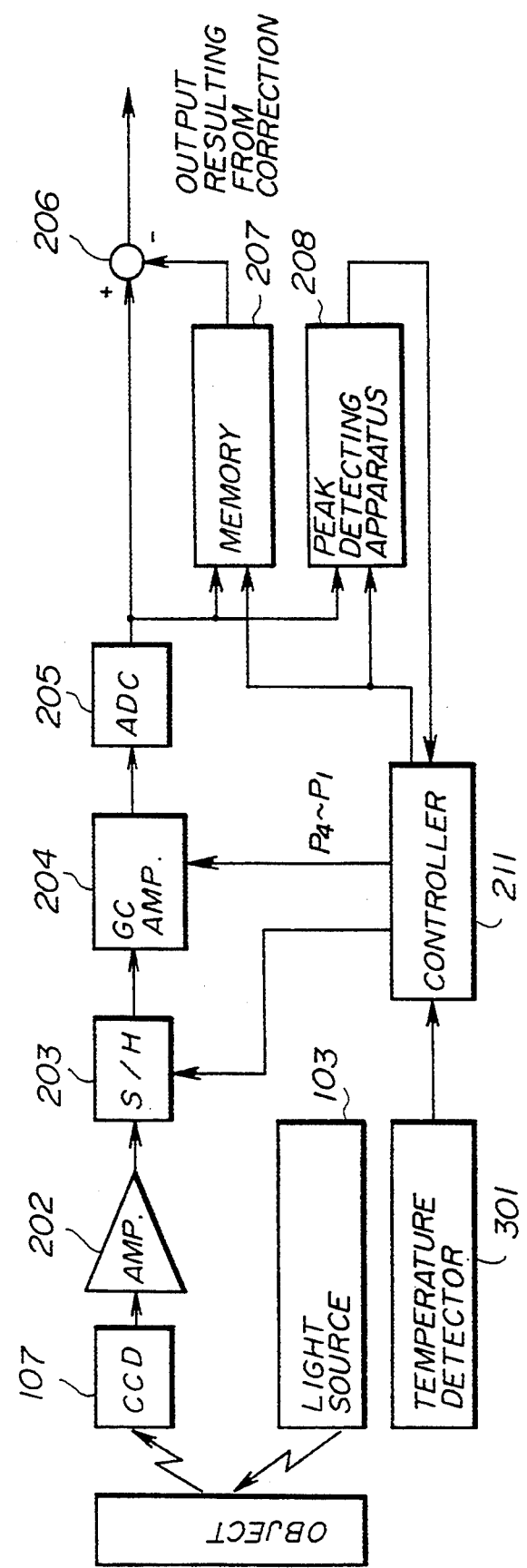
FIG.9 shows a simplified block diagram of an image signal processing system of fourth and fifth embodiments of an image reading apparatus according to the present invention.

In FIG.9, controller 211 controls a gain of the GC AMP 204 based on a temperature data obtained by the temperature detector 301 and data provided from a peak detecting apparatus 208.

Figure 10:
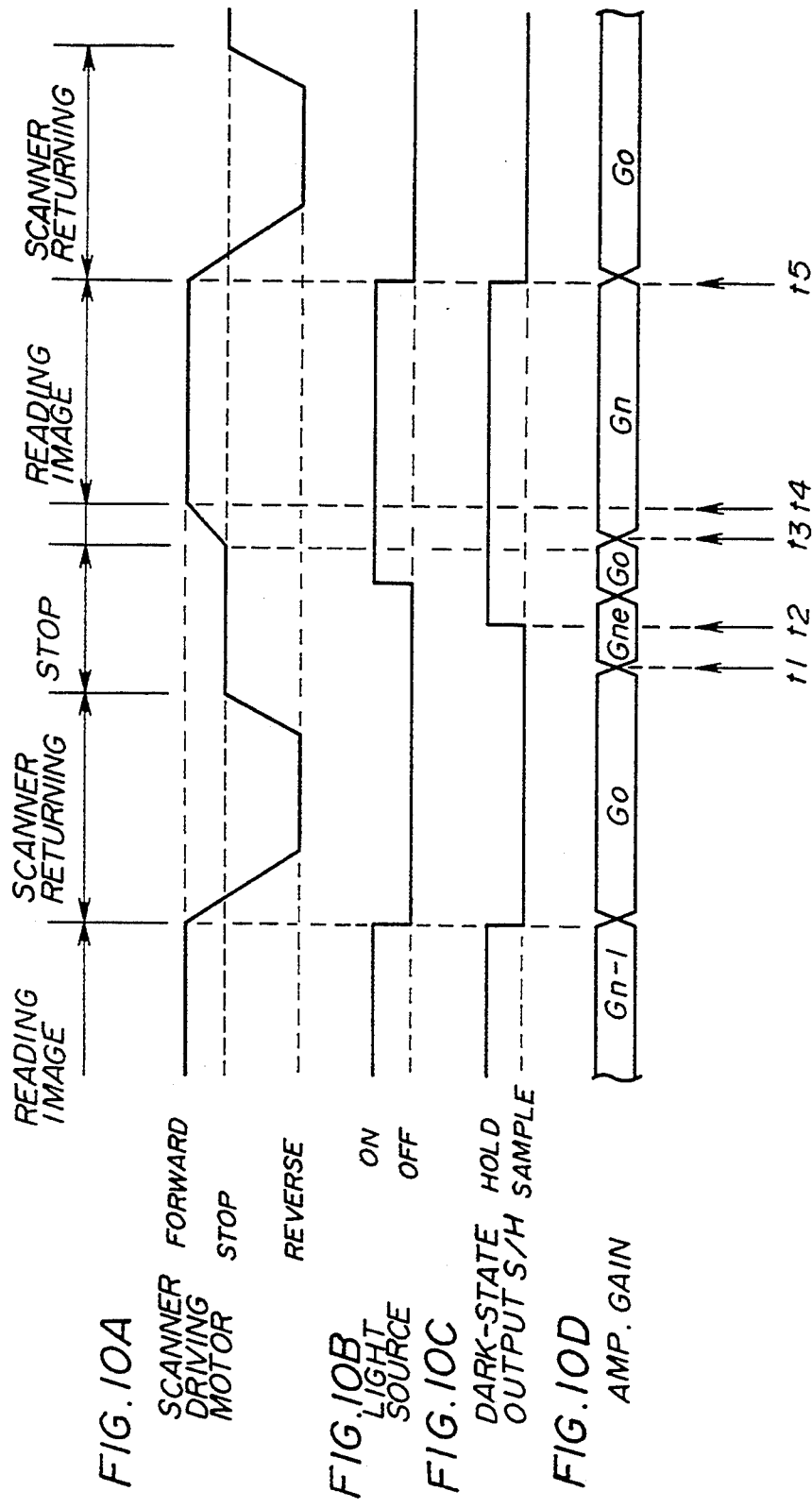
FIGS.10A through 10D respectively show operating timing charts of a fourth embodiment of an image reading apparatus according to the present invention.

A controller 211 also controls respective operation timing of: a scanner driving motor (not shown in the drawings) for driving the scanner so as to drive it in the forward or reverse directions or stop it as shown in FIG.10A; turning on and off of the light source 103 as shown in FIG.10B; data sampling and holding by the S/H 203 as shown in FIG.10C; storing of data in the memory 207; and making the peak detecting apparatus 208 deliver a controlling signal. The controller 212 also makes the peak detecting apparatus 208 deliver the controlling signal (1, 1, 1, 0) to the GC AMP 204 so as to set the reference gain Go (15/14) thereto as shown in FIG.10D.

FIG.14 is a table showing a relationship between tube-temperatures and illuminance-ratios typical for a fluorescent lamp. This relationship is based on a property of the lamp. The table is able to be used for a conversion table to obtain illuminance-ratios from tube-temperatures. The controller 211 is given data corresponding to contents of the table, that is as a discrete illuminance-ratio data versus tube-temperature of the light source.

FIGS.10A through 10D respectively show operation timing charts with respect to the above mentioned fourth embodiment of the image reading apparatus according to the present invention. In FIG.10D, Gne, Go, Gn−1, and Gn respectively indicate gains set in the GC AMP 204. The Gne is a gain to be obtained by a means of forecasting as mentioned later. The gain Go is the above mentioned reference-gain. The gain Gn−1 is a gain used during a previous-image-reading-state. The gain Gn is a gain used during a present-image-reading-state.

Figure 15:
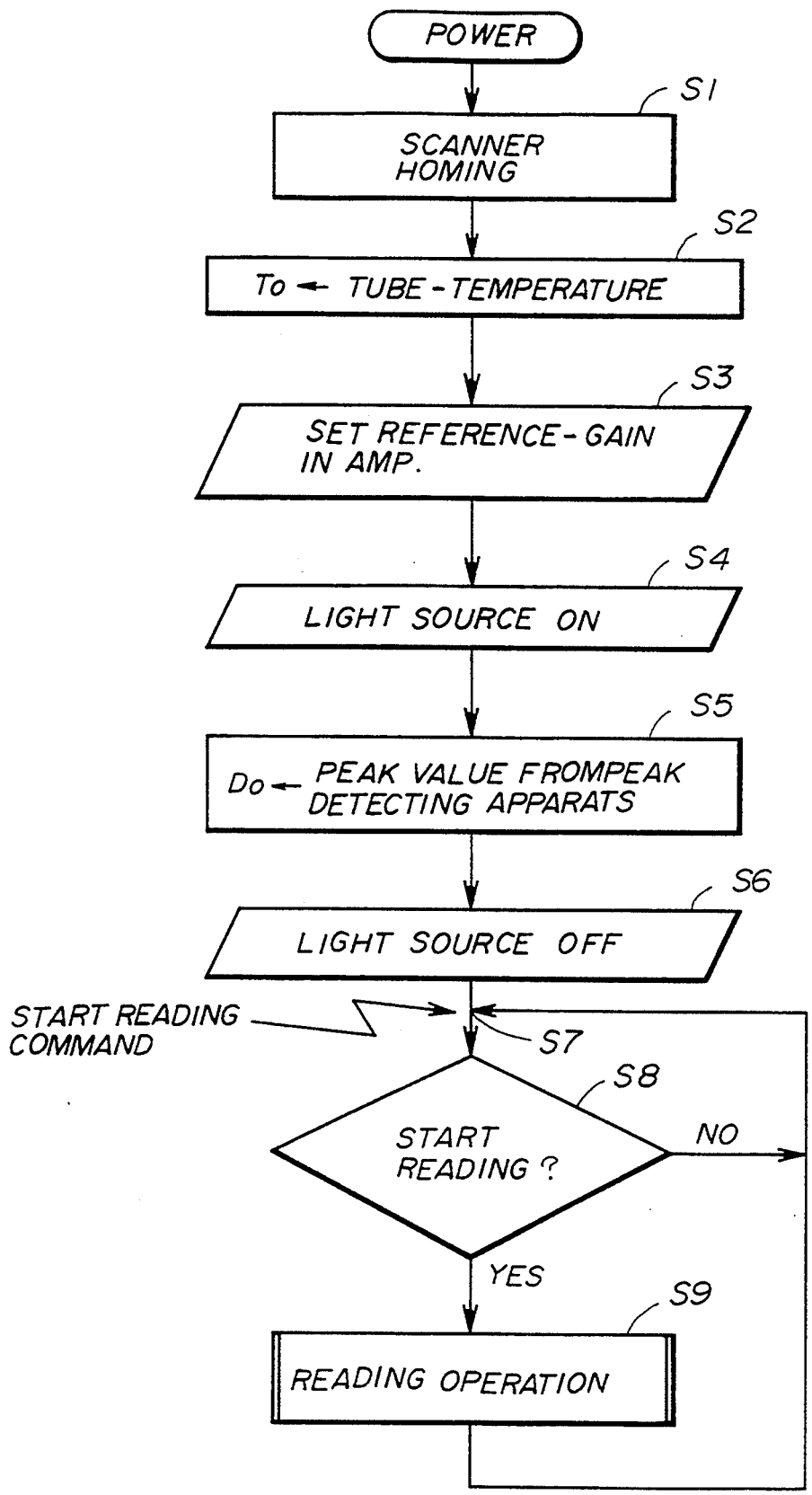
FIG.15 shows an operation flow chart of a main routine indicating operations after electric power is applied to the fourth embodiment of the image reading apparatus according to the present invention.
Figure 16:
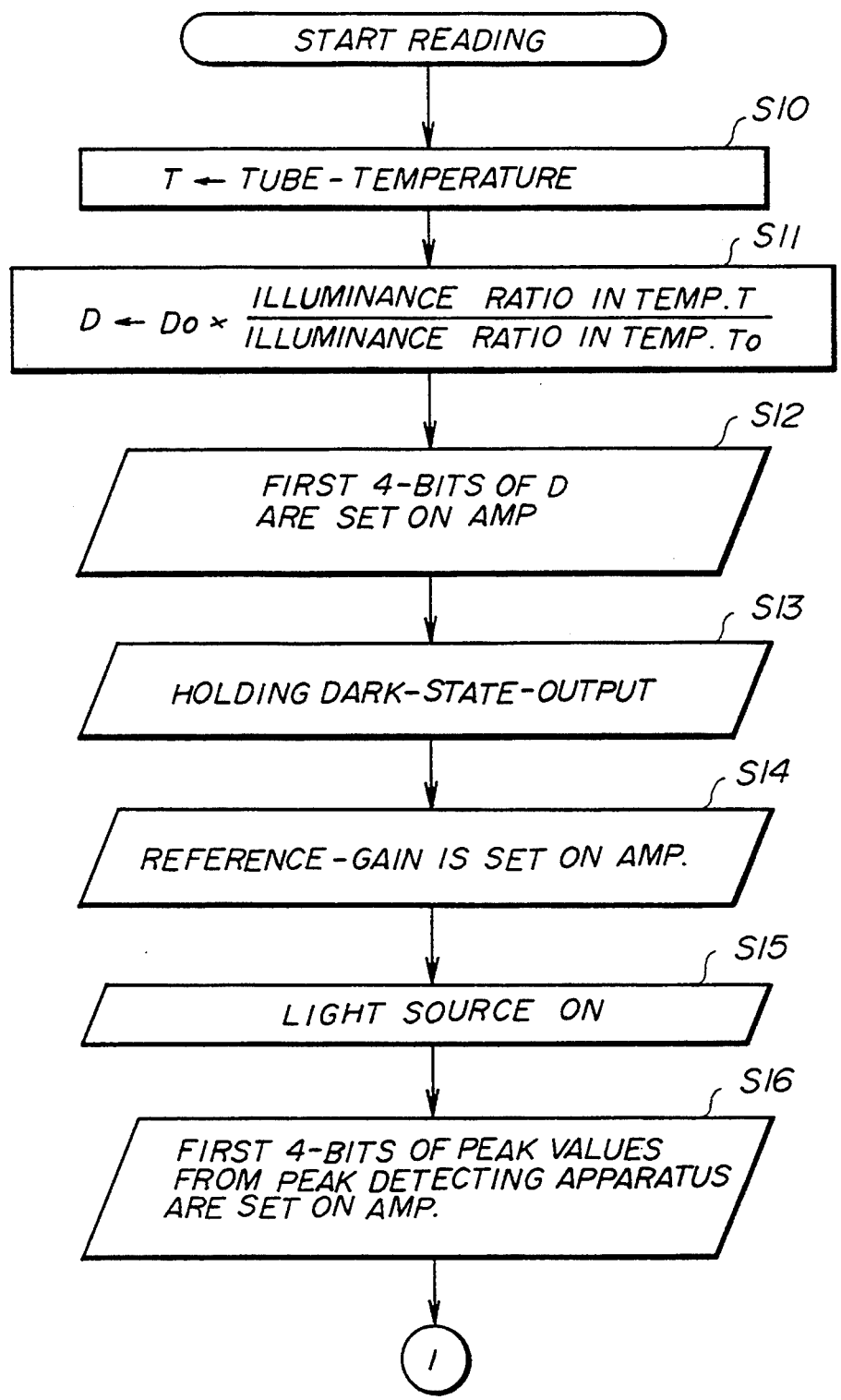
FIG.16 shows an operation flow chart of a former part of a sub-routine indicating an image-reading-operation of the main-routine shown in FIG.15.
Figure 17:
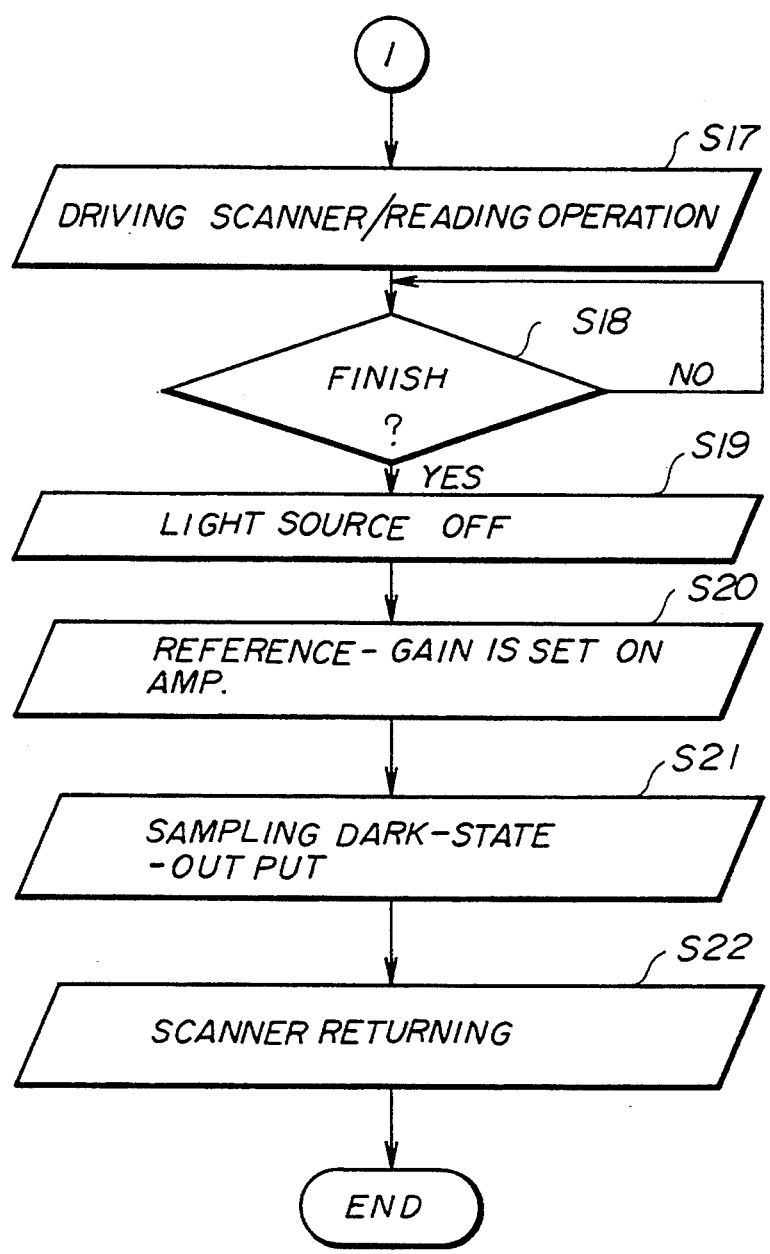
FIG.17 shows an operation flow chart of a latter part of a sub-routine indicating an image-reading-operation of the main-routine shown in FIG.15.

FIGS.15, 16, and 17 are flow-charts showing operations with respect to the fourth embodiment of the image reading apparatus according to the present invention. FIG.15 shows an overall sequential operation after electric power is applied to the image reading apparatus. Firstly after the electric power being applied, the scanner, which comprising the light source 103, first, second, and third mirrors 104, 105a, and 105b and other devices is returned to a home position(step S1, a term 'step' will be omitted hereinafter). The home position is a position in which the light source 103, the mirrors 104, 105a, and 105b drawn by solid line are located in FIG.1. The home position is the same as a start-reading position. A reference-white-board 102 is provided so as to be located in a position. The position of the reference-white-board 102 is applied light, which is emitted from the light source 103, when the light source 103 is located in the start-reading position. In S2 through S5, the peak value Do of illuminance data for the light source 103 is sampled where a tube-temperature thereof is To. The peak value Do thus is stored in a memory 207. The light source 103 is turned off in S6. This condition is preparatory to the start of image-reading.

FIGS.16 and 17 shows a operation of the image reading apparatus in a reading-operation-subroutine. Present tube-temperature is sampled in S10 of FIG.16. Illuminance is forecasted by means of the conversion table shown in FIG.14 in S11. This illuminance would be obtained immediately after a light source 103 is turned on. A gain of the GC AMP is, in S12 (at t1 in FIGS.10A through 10D), set by means of controlling switches SW$_1$ through SW$_4$ according to a controlling signal P$_1$ through P$_4$. The controlling signals P$_1$ through P$_4$ correspond to the most significant 4-bits of a value D expressed in the binary system. The value D is obtained by the following equation:

$$D = D_0 \times \frac{\text{illuminance-ratio in tube-temperature } T}{\text{illuminance-ratio in tube-temperature } T_0} \quad (4)$$

In a situation of the GC AMP 204 possessing the gain Gne set in S12, the dark-state-output, as a result of the CCD AMP 107 output being amplified by the GC AMP 204, is held in the memory 207 in S13 (at t2 in FIGS.10A through 10D). The dark-state-output is used for the above mentioned dark-state-output-correction to be performed on image-reading-output. A gain of the GC AMP 204 is set in S14 through S16 (at t3 in FIGS.10A through 10D), as mentioned above in the description of the example of the image reading apparatus relating to the present invention as shown in FIGS.5A through 5D. The setting of the gain is obtained by using a peak detecting apparatus 208. The apparatus 208 provides the peak data detected from an actual image-reading-output. The actual image-reading-output is obtained as a result of the following processes. Output of a CCD 107 as a result of reading the reference-white-board, is amplified by the GC AMP 204 possessing the reference gain Go.

Then an inscribed paper (a sheet of paper, in which an original image to be read is drawn) placed on a glass 101 is, successively if plurality of sheets of paper drawn original images are being read (NO in S18), read by means of the above mentioned scanner in S17 (at t4 through t5 in FIGS.10A through 10D) (this operation in S17 is call image-reading-operation hereinafter). This reading operation is performed until the finish of the image-reading-operation. If the image-reading-operation in S17 is finished, this finish being determined in S18, that is, YES in S18, the light source 103 is then turned off in S19. A gain of the GC AMP 204 is then set to the reference-gain Go in S20. A dark-state-output is then sampled (this dark-state-output is only sampled but it is not held in the memory 207; it is discarded). The scanner then returns to the home position in S22. This process of S19 through S22 is performed preparatory to next start of an image-reading-operation.

It is possible to perform a correction on the tube-temperature—illuminance-ratio conversion table shown in FIG.14. The correction is based on data obtained by processes of S2, S5, S10, and S16. The data is actual tube-temperatures obtained by means of the temperature detector 301 and the corresponding actual peak values given by the peak detection apparatus 208. The peak values are obtained as a result of actual outputs of the CCD 107. This actual output of the CCD 107 is obtained as a result of being applied reflected light from the reference-white-board 103. The light source 103 applies light to the reference-white-board 103. A reason why a correction using the conversion table can be performed by means of the data obtained by processes of S2, S5, S10, and S16 is described below. That is, a ratio of peak values obtained between S5 and S16 corresponds to a ratio of illuminance-ratios corresponding to a ratio of tube-temperatures obtained between in S1 and S10. Errors of the forecasted peak value, which is obtained in S11 as a result of the forecasted illuminance of the light source before turning it on, can be eliminated by the above mentioned correction. The errors may be produced by change of tube-temperature—illuminance-ratio characteristics of the light source caused by aging. This correction is performed on the tube-temperature—illuminance-ratio conversion table by means of actual data. This actual data is such as the above mentioned tube-temperatures and peak values obtained in S2, S5, S10, and S16. Thus, accurate forecasting of illuminance of the light source 103 can be realized. Thus, it becomes possible to perform the dark-state-correction on an image-reading-output accurately. A reason for this is that the bases of obtaining output can be equalized between the duration of the dark-state and the duration of image-reading-state by means of the accurate forecasting of the illuminance of light source 103 before turning it on.

Next, a fifth embodiment of a image reading apparatus according to the present invention will be described below. The fifth embodiment has a composition the same as the composition of the above mentioned fourth embodiment excepting a part of the operation thereof. The part is made modification performed on the corresponding part of operations of the fourth embodiment. Thus, the description of the fifth embodiment comprises only a description of the modified part of the operation of the fourth embodiment.

As mentioned above, a fluctuation of the light source is a relatively slow action in contrast to a speed of an image-reading action of the scanner. Further, illuminance of a light source, particularly if the light source is a fluorescent lamp, depends on a tube-temperature thereof. The fifth embodiment is made in point of view of these above mentioned properties with respect to devices included in the image reading apparatus. That is, in the fifth embodiment, illuminance of the light source during an image-reading-state is forecasted before turning on the light source. This forecasting is performed by means of the tube-temperature—illuminance-ratio conversion table shown in FIG.14 and actual illuminance data obtained by reading the reference-white-board. Then a gain of the GC AMP 204 is set based on the forecasted illuminance. The gain is used for obtaining a dark-state-output. This operation is the same as the corresponding operation of the description of the fourth embodiment. In the fifth embodiment, this operation is performed if a single-independent-image-reading operation is performed or if first-time-image-reading operation of a plurality of image-reading operations is performed.

On the other hand, a gain of the GC AMP 204, which is used during a single-previous-image-reading-state, is also used for obtaining a dark-state-output. This gain has been set for the previous-reference-white-board-reading-state. This previous-reference-white-board-reading has been performed just before the previous-image-reading-state. This operation is the same as the corresponding operation of the first, second and third embodiments of the image reading apparatus according to the present invention. This operation is performed per each time of image-reading-operations. And this operation is performed if second and later time image-reading-operations of the plurality of image-reading-operations are performed.

Figure 11:
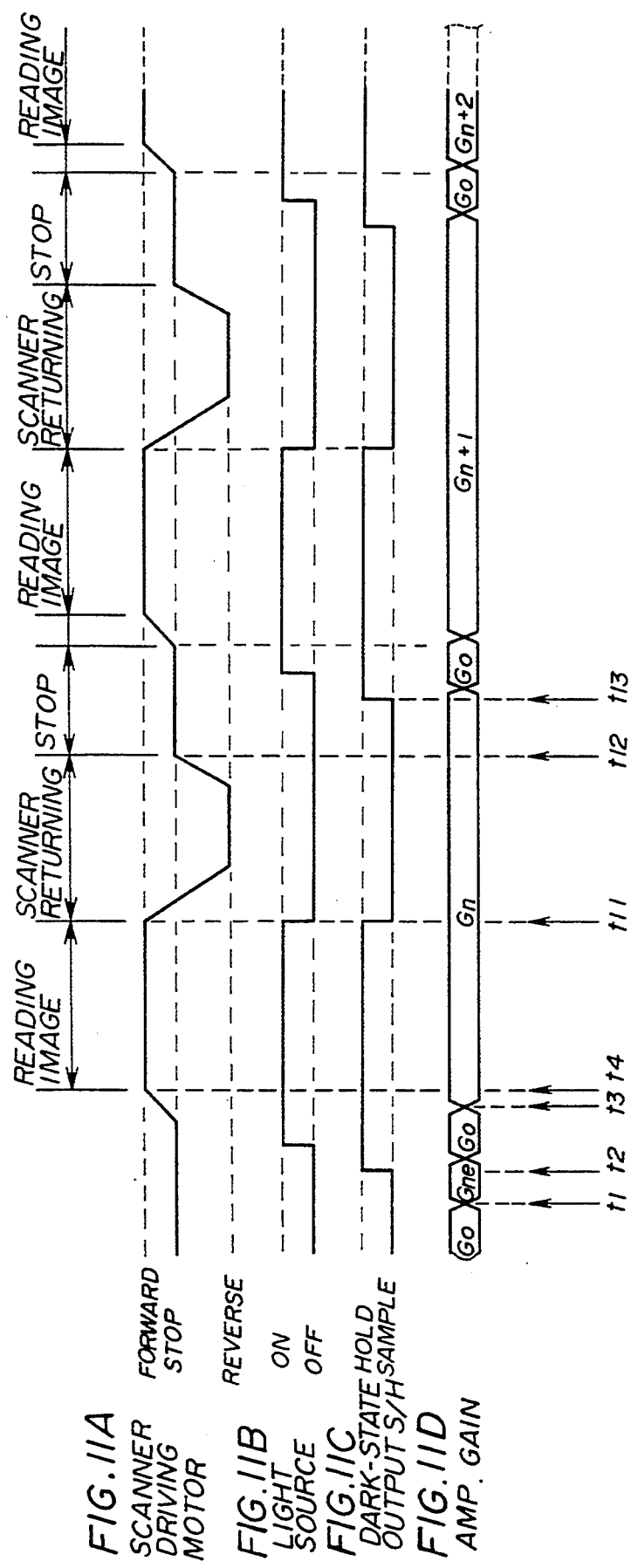
FIGS.11A through 11D respectively show operating timing charts of a fifth embodiment of an image reading apparatus according to the present invention.

FIGS.11A through 11D respectively show operation timing charts of the fifth embodiment. In FIG.11D, Gne, Go, Gn, Gn+1, Gn+2 respectively indicate gains of the GC AMP 204. A gain Gne is a gain obtained by means of forecasting. A gain Go is a reference gain. A gain Gn is a gain used at a first-image-reading-operation. A gain Gn+1 is a gain used at a second-image-reading-operation. A gain Gn+2 is a gain used at a third-image-reading-operation.

A controller 211 controls respective operation timing of: a scanner driving motor (not shown in the drawings) for driving the scanner so as to drive it in the forward or reverse directions or stop it as shown in FIG.11A; turning on and off of the light source 103 as shown in FIG.11B; data sampling and holding by the S/H 203 as shown in FIG.11C; storing of data in the memory 207; and making the peak detecting apparatus 208 deliver a controlling signal. The controller 212 makes the peak detecting apparatus 208 deliver the controlling signals (1, 1, 1, 0) to the GC AMP 204 so as to set the reference gain Go (15/14) thereto as shown in FIG.11D.

Figure 18:
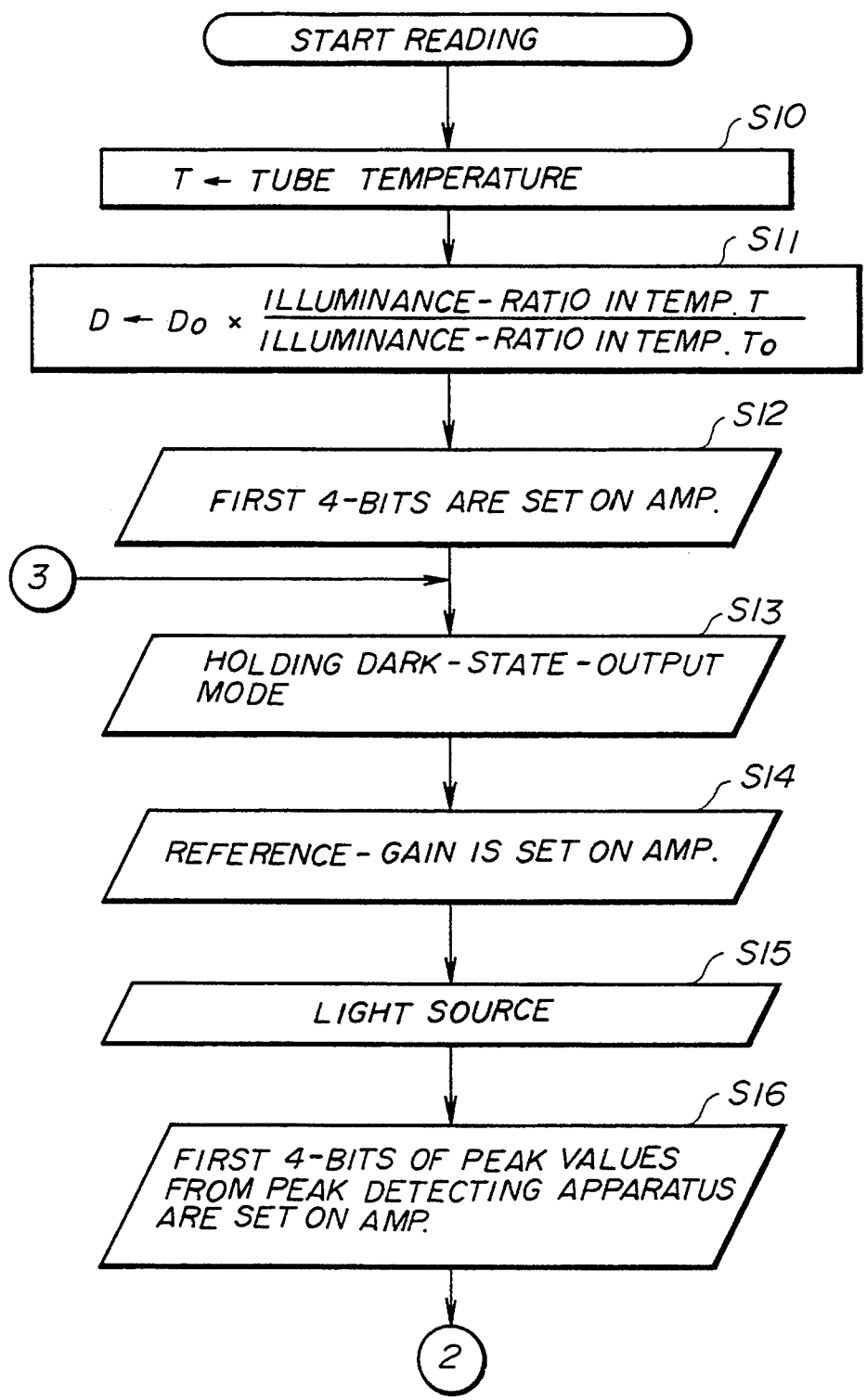
FIG.18 shows an operation flow chart of a former part of a sub-routine indicating an image-reading-operation of the fifth embodiment of the image reading apparatus according to the present invention.
Figure 19:
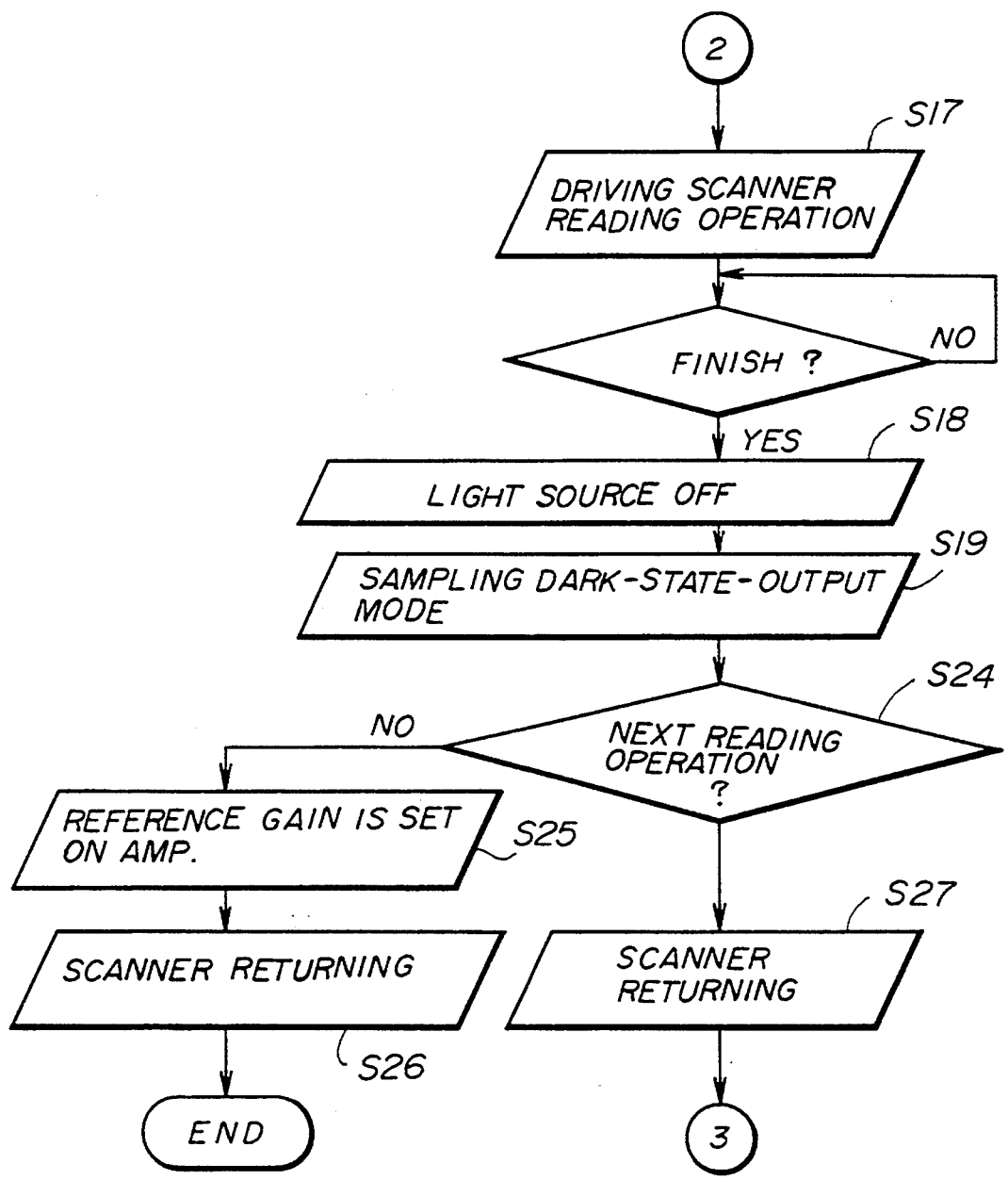
FIG.19 shows an operation flow chart of a latter part of a sub-routine indicating an image-reading-operation of the fifth embodiment of the image reading apparatus according to the present invention.

FIG.18, and 19 show operation flow charts respectively corresponding to the flow charts of the fourth embodiment shown in FIGS.16, and 17. FIGS.18, 19 show the start-reading-subroutine. The same step-numerals (S1, S2 etc.) given to steps in FIGS.16, 17 will be given to corresponding steps in FIGS.18, 19. Also, a description of steps corresponding to the steps also shown in FIGS. 16, 17 will be omitted.

In FIG.19, after turning off the light source 103 (S18), a sampling-dark-state-output-mode is performed (S19) (t11 in FIGS.11A through 11D). Here, it is determined whether a next image-reading-operation will be performed or not (S24). This determination is performed for determine whether or not a successive plurality of image-reading-operations is being performed. This determination is made based on a certain command done by an operator performed on the image reading apparatus. For example, an operation performed thereon by the operator so as to direct designation of number of image-reading-operations to be performed. Or the determination is made by detection of the existence of a next sheet of paper by the image reading apparatus, in which sheet of paper a next original image to be read is drawn.

An image-reading-operation is finished after setting the reference-gain on the GC AMP 204 (S25). The scanner returns to the home position (S26). This finishing operation is performed if there is not a next image-reading-operation to be done in S24 ('NO' therein).

On the other hand if a next image-reading-operation should be performed in S24 (YES therein), the scanner is returned (S27) (at t11 through t12 in FIGS.11A through 11D). And a gain of the GC AMP 204 remains at Gn, where Gn is the same as a gain used in the first-image-reading-operation. S13 is then performed. In S13, a dark-state-output is held in the memory 207 (S13) (at t13 in FIGS.11A through 11D). Then, the same operation as the corresponding operation performed at the first-reading-operation is performed in S14 through S19 and S24. Then, the same operation will be performed as the above mentioned corresponding operation from S24. This operation will be continued until the finish of the successive image-reading-operations, the finish being in S25 and S26 as mentioned above.

In an inventive philosophy of the first, second, and third embodiments of the image reading apparatus according to the present invention, a level-controlling-quantity, for example, a gain of the GC AMP 204, used for obtaining a dark-state-output is set. The level-controlling-quantity to be set is obtained during previous-image-reading-state, for example, being obtained by reading a reference-white-board.

Further in another inventive philosophy of the fourth embodiment of the image reading apparatus according to the present invention, a level-controlling-quantity, for example, a gain of the GC AMP 204, used for obtaining a dark-state-output is set. The level-controlling-quantity to be set is obtained by forecasting a reading-condition of the image reading apparatus. A level-controlling-quantity is to be set for an image-reading-state. For example, illuminance of a light source is forecasted before turning on the light source. This forecasting is performed by means of the image-reading-condition detecting means, for example, a temperature detector. This temperature detector detects a tube-temperature of the light source. The above mentioned level-controlling-quantity, which is forecasted, is, for example, a gain of the GC AMP 204. This gain is determined by means of reading the reference-white-board just before the image-reading-state.

Further more in another inventive philosophy of the fifth embodiment of the image reading apparatus according to the present invention, a level-controlling-quantity, for example, a gain of the GC AMP 204, used for obtaining a dark-state-output is set. The following operation (for obtaining the level-controlling-quantity) is performed if a single-independent-image-reading-operation is performed or if first-image-reading-operation of a successive plurality of image-reading-operations is performed. The level-controlling-quantity to be set is obtained by forecasting an image-reading-condition of the image reading apparatus. A level-controlling-quantity is set for an image-reading-state. For example, illuminance of a light source is forecasted before turning on the light source. This forecasting is performed by means of the image-reading-condition detecting means. For example, a temperature detector, for detecting tube-temperature of the light source, is used for the forecasting. On the other hand, the following operation(for obtaining the level-controlling-quantity) is performed if a second or later image-reading-operation of the successive plurality of image-reading-operations is performed. A level-controlling-quantity, for example, a gain of the GC AMP 204, is also used for obtaining a dark-state-output. For example, the gain of the AMP 204 is determined by reading a reference-white-board. The level-controlling-quantity to be set is obtained during the previous-image-reading-state.

Thus, in the image reading apparatus according to the present invention, it becomes possible to equalize level-controlling-quantities respectively used for obtaining the following outputs. One of the outputs is the dark-state-output. The other of the outputs is an image-reading-output. In the image reading apparatus, thus, it also becomes possible to perform an accurate dark-state-output-correction, and to prevent increasing the image-reading-time (by means of eliminating turning on the light source just before the image-reading-operation) at a same time. Then it also becomes possible to provide an image reading apparatus having high tone level resolving ability and high accuracy.

Further, the present invention is not limited to these preferred embodiments, and various variations and modifications may be made without departing from the scope of the present invention.

What is claimed is:

1. An image reading apparatus comprising:
   a light source for applying light onto either a reference white board or an original image, said reference white board or said original image thus reflecting the applied light;
   reading means including a photoelectric converting means for receiving and storing therein any one of the light reflected by said reference white board, the light reflected by said original image, and light obtained in a condition where said light source emits no light, said photoelectric converting means converting the thus stored light into corresponding image signals;

said reading means further comprising processing means for processing said image signals using control values to obtain processed image data;

said reading means reading light data of any of the light reflected by said reference white board and the light reflected by said original image in a light-source switched-on condition, and the light obtained in a light-source switched-off condition;

said reading means reading the light data of the light reflected by said reference white board in the light-source switched-on condition before reading the light data of the light reflected by an original image in the light-source switched-on condition;

setting means for setting values as the control values to be used for current reading operations of said reading means;

said setting means setting the control value used in a preceding operation of said reading means as the control value to be used for a current reading operation of said reading means if said current reading operation of said reading means is carried out in the light-source switched-off condition, said preceding operation of said reading means being an operation reading light data of light reflected from an original image in the light-source switched-on condition;

said setting means setting a predetermined reference value as the control value to be used for a current reading operation of said reading means if said current reading operation of said reading means reads light data of light reflected by said reference white board in the light-source switched-on condition;

said setting means setting the control value to be used for a current reading operation of said reading means if said current reading operation of said reading means reads light data of light reflected by an original image in the light-source switched-on condition, said control value dependent on the processed image data obtained through said reading means reading said reference white board before said current reading operation of said reading means;

storing means for storing the processed image data obtained through said reading means reading light obtained in the light-source switched-off condition; and correcting means for correcting the processed image data obtained through said reading means reading light data of light reflected by an original image in the light-source switched-on condition, the correcting operation using the processed image data obtained through said reading means reading light data of light obtained in the light-source switched-off condition, the used processed image data being the processed image data having been stored by means of said storing means.

2. The image reading apparatus according to claim 1, further comprising:

peak detecting means for detecting peak values of the processed image data obtained through said processing means;

said processing means processing, depending on the peak values detected by said peak detecting means, the image signals obtained through said photoelectric converting means so that values indicated by said processed image data obtained through said processing means as a result of processing said image signals become smaller as said peak values become larger;

the control signal, set by said setting means as the control value if a current reading operation of said reading means reads light data of light reflected by an original image in the light-source switched-on condition, is the peak value of the processed image data obtained through said processing means as a result of processing the image signal obtained through said reading means reading light data of light reflected by said reference white board in the light-source switched-on condition before said current reading operation of said reading means reading the light data of the light reflected by said original image in the light-source switched-on condition; and said correcting means correcting the processed image data obtained through said reading means reading light data of light reflected by an original image in the light-source switched-on condition, so that the processed image data, obtained through said reading means reading light data of light obtained in the light-source switched-off condition, is subtracted from the processed image data obtained through said reading means reading light data of light reflected by an original image in the light-source switched-on condition.

3. The image reading apparatus according to claim 1, wherein said processing means comprises gain controlled amplifier for amplifying, with gains, the image signal obtained through said photoelectric converting means;

said setting means setting the values to be used as the gain for said gain controlled amplifier to amplify the image signals in current reading operations of said reading means;

said setting means setting the gain used in a preceding operation of said reading means as the gain to be used for said gain controlled amplifier to amplify the image signal in a current reading operation of said reading means if said current reading operation of said reading means is carried out in the light-source switched-off condition, said preceding operation of said reading means being an operation reading light data of light reflected from an original image in the light-source switched-on condition;

said setting means setting a predetermined reference value as the gain to be used for said gain controlled amplifier to amplify the image signal in a current reading operation of said reading means if said current reading operation of said reading means reads light data of light reflected by said reference white board in the light-source switched-on condition;

said setting means setting a certain value as the gain to be used for said gain controlled amplifier to amplify the image signal in a current reading operation of said reading means if said current reading operation of said reading means reads light data of light-reflected by an original image in the light-source switched-on condition, said certain value dependent on the processed image data obtained through said reading means reading light data of light reflected by said reference white board in the light-source switched-on condition before said current reading operation of said reading means; and said correcting means correcting the processed image data obtained through said reading means reading light data of light reflected by an original image in the light-source switched-on condition, the correcting operation using the processed image data obtained through aid reading means reading light data of light obtained in the light-source switched-off condition, the used processed image data being the processed image data having been stored by means of said storing means.

4. The image leading apparatus according to claim 1, wherein said processing means comprises analog-to-digital converting means for converting, with reference levels, the image signal obtained through said photoelectric converting means;

said setting means setting the values to be used as the reference level for said analog-to-digital converting means to amplify the image signals in current reading operations of said reading means;

said setting means setting the reference level used in a preceding operation of said reading means as the reference level to be used for said analog-to-digital converting means to amplify the image signal in a current reading operation of said reading means if said current reading operation of said reading means is carried out in the light-source switched-off condition, said preceding operation of said reading means being an operation reading light data of light reflected from an original image in the light-source switched-on condition;

said setting means setting a predetermined reference value as the reference level to be used for said analog-to-digital converting means to amplify the image signal in a current reading operation of said reading means if said current reading operation of said reading means reads light data of light reflected by said reference white board in the light-source switched-on condition;

said setting means setting a certain value as the reference level be used for said analog-to-digital converting means to amplify the image signal in a current reading operation of said reading means if said current reading operation of said reading means reads light data of light reflected by an original image in the light-source switched-on condition, said certain value dependent on the processed image data obtained through said reading means reading light data of light reflected by said reference white board in the light-source switched-on condition before said current reading operation of said reading means; and said correcting means correcting the processed image data obtained through said reading means reading light data of light reflected by an original image in the light-source switched-on condition, the correcting operation using the processed image data obtained through said reading means reading light data of light obtained in the light-source switched-off condition, the used processed image data being the processed image data having been stored by means of said storing means.

5. The image reading apparatus according to claim 1, wherein said processing means comprises a light-storing-time controlling means for controlling light-storing-time of said photoelectric converting means;

said setting means setting the values to be used as the light-storing-time for said light-storing-time controlling means to amplify the image signals in current reading operations of said reading means;

said setting means setting the light-storing-time used in a preceding operation of said reading means as the light-storing-time to be used for said light-storing-time controlling means to amplify the image signal in a current reading operation of said reading means if said current reading operation of said reading means is carried out in the light-source switched-off condition;

said setting means setting a predetermined reference value as the light-storing-time to be used for said light-storing-time controlling means to amplify the image signal in a current reading operation of said reading means if said current reading operation of said reading means reads light data of light reflected by said reference white board in the light-source switched-on condition;

said setting means setting a certain value as the light-storing-time used for said light-storing-time controlling means to amplify the image signal in a current reading operation of said reading means if said current reading operation of said reading means reads light data of light reflected by an original image in the light-source switched-on condition, said certain value dependent an the processed image data obtained through said reading means reading light data of light reflected by said reference white board in the light-source switched-on condition before said current reading operation of said reading means; and said correcting means correcting the processed image data obtained through said reading means reading light data of light reflected by an original image in the light-source switched-on condition, the correcting operation using the processed image data obtained through said reading means reading light data of light obtained in the light-source switched-off condition, the used processed image data being the processed image data having been stored by means of said storing means.

6. An image reading apparatus comprising:

a light source for applying light onto either a reference white board or an original image, said reference white board or said original image thus reflecting the applied light;

a temperature detecting means for detecting the temperature of said light source;

temperature-illuminance converting means for converting a value of the temperature of said light source into a corresponding illuminance value, said temperature being the temperature detected by said temperature detecting means in a light-source switched-off condition;

reading means comprising a photoelectric converting means for receiving and storing therein any one of the light reflected by said reference white board, the light reflected by said original image, and light obtained in the light-source switched-off condition, said photoelectric converting means converting the thus stored light into corresponding image signals, said reading means further comprising processing means for processing said image signals using control values to obtain processed image data, thus said reading means reading light data of any of the light reflected by said reference white board and the light reflected by said original image in a light-source switched-on condition, and the light obtained in the light-source switched-off condition;

said reading means reading the light data of the light reflected by said reference white board in the light-source switched-on condition before reading the light data of the light reflected by an original image in the light-source switched-on condition;

setting means for setting values as the control values to be used for current reading operations of said reading means, said setting means setting a control value dependent on the illuminance value obtained through said temperature-illuminance converting means as the control value to be used for a current reading operation of said reading means if said current reading operation of said reading means is carried out in the light-source switched-off condition;

said setting means setting a predetermined reference value an the control value to be used for a current reading operation of said reading means if said current reading operation of said reading means reads light data of light reflected by said reference white board in the light-source switched-on condition;

said setting means setting a certain value as the control value to be used for a current reading operation of said reading means if said current reading operation of said reading means reads light data of light reflected by an original image in the light-source switched-on condition, said certain value dependent on the processed image data obtained through said reading means reading said reference white board before said current reading operation of said reading means;

storing means for storing the processed image data obtained through said reading means reading light obtained in the light-source switched-off condition; and correcting means for correcting the processed image data obtained through said reading means reading light data of light reflected by an original image in the light-source switched-on condition, the correcting operation using the processed image data obtained through said reading means reading light data of light obtained in the light-source switched-off condition, the used processed image data being the processed image data having been stored by means of said storing means.

7. The image reading apparatus according to claim 6, wherein the control value, dependent an the illuminance value and set by said setting means as the control value to be used for a current reading operation of said reading means if said current reading operation of said reading means is carried out in the light-source switched-off condition, is obtained by using a result of a previous reading operation performed by said reading means reading light data of light reflected by said reference white board in the light-source switched-on condition and also using the temperature of said light source during said previous reading operation.

8. An image reading apparatus comprising:

a light source for applying light onto either a reference white board or an original image, said reference white board or said original image thus reflecting the applied light;

a temperature detecting means for detecting the temperature of said light source;

temperature-illuminance converting means for converting a value of the temperature of said light source into a corresponding illuminance value, said temperature being the temperature detected by said temperature detecting means in a light-source switched-off condition;

reading means comprising a photoelectric converting means for receiving and storing therein any one of the light reflected by said reference white board, the light reflected by said original image, and light obtained in the light-source switched-off condition, said photoelectric converting means converting the thus stored light into corresponding image signals, said reading means further comprising processing means for processing said image signals using control values so as to obtain processed image data, thus said reading means reading light data of any of the light reflected by said reference white board and the light reflected by said original image in a light-source switched-on condition, and the light obtained in the light-source switched-off condition;

said reading means reading the light data of the light reflected by said reference white board in the light-source switched-on condition before reading the light data of the light reflected by an original image in the light-source switched-on condition;

determining means for determining whether or not a current reading operation performed by said reading means Is one of a successive plurality of reading operations;

wherein, if said determining means has determined that said current reading operation is one of said successive plurality of reading operations, said determining means further determines whether said current reading operation is the first one of said successive plurality of reading operations;

setting means for setting values as the control values to be used for current reading operations of said reading means;

either if a current reading operation performed by said reading means is determined by said determining means to be one of a successive plurality of reading operations or if a current reading operation performed by said reading means is determined by said determining means not to be one of successive plurality of reading operations;

said setting means setting a control value dependent on the illuminance value obtained through said temperature-illuminance converting means as the control value to be used for a current reading operation of said reading means if said current reading operation of said reading means is carried out in the light-source switched-off condition;

said setting means setting a predetermined reference value as the control value to be used for a current reading operation of said reading means if said current reading operation of said reading means reads light data of light reflected by said reference white board in the light-source switched-on condition;

said setting means setting a certain value as the control value to be used for a current reading operation of said reading means if said current reading operation of said reading means reads light data of light reflected by an original image in the light-source switched-on condition, said certain value dependent on the processed image data obtained through said reading means reading said reference white board before said current reading operation of said reading means;

if the current reading operation performed by said reading means is determined by said determining means to be one of but not to be the first one of successive plurality of reading operations;

said setting means setting the control value used in a preceding operation of said reading means as the control value to be used for a current reading operation of said reading means if said current reading operation of said reading means is carried out in the light-source switched-off condition, said preceding operation of said reading means being an operation reading light data of light reflected from an original image in the light-source switched-on condition;

said setting means setting a predetermined reference value as the control value to be used for a current reading operation of said reading means if said current reading operation of said reading means reads light data of light reflected by said reference white board in the light-source switched-on condition;

said setting means setting a certain value as the control value to be used for a current reading operation of said reading means if said current reading operation of said reading means reads light data of light reflected by an original image in the light-source switched-on condition, said certain value dependent on the processed image data obtained through said reading means reading said reference white board before said current reading operation of said reading means;

storing means for storing the processed image data obtained through said reading means reading light obtained in the light-source switched-off condition; and correcting means for correcting the processed image data obtained through said reading means reading light data of light reflected by an original image in the light-source switched-on condition, the correcting operation using the processed image data obtained through said reading means reading light data of light obtained in the light-source switched-off condition, the used processed image data being the processed image data having been stored by means of said storing means.

9. An image reading method comprising the steps of:

a) applying, with a light source, light onto either a reference white board or an original image, said reference white board or said original image thus reflecting the applied light;

b) receiving, through a photoelectric converting means, and storing therein any one of the light reflected by said reference white board, the light reflected by said original image, and light obtained in a condition where said light source emits no light, said photoelectric converting means converting the thus stored light into corresponding image signals, said step b) further comprising a step b-1) processing said image signals using control values to obtain processed image data, thus said step b) reading light data of any of the light reflected by said reference white board and the light reflected by said original image in a light-source switched-on condition, and the light obtained in a light-source switched-off condition;

said step b) reading the light data of the light reflected by said reference white board in the light-source switched-on condition before reading the light data of the light reflected by an original image in the light-source switched-on condition;

c) setting values as the control values to be used for current reading operations of said step b);

said step c) setting the control value used in a preceding operation of said step b) as the control value to be used for a current reading operation of said step b) if said current reading operation of said step b) is carried out in the light-source switched-off condition, said preceding operation of said step b) being an operation reading light data of light reflected from an original image in the light-source switched-on condition;

said step c) setting a predetermined reference value as the control value to be used for a current reading operation of said step b) if said current reading operation of said step b) reads light data of light reflected by said reference white board in the light-source switched-on condition;

said step c) setting a certain value an the control value to be used for a current reading operation of said step b) if said current reading operation of said step b) reads light data of light reflected by an original image in the light-source switched-on condition, said certain value dependent on the processed image data obtained through said step b) reading said reference white board before said current reading operation of said step b);

d) storing the processed image data obtained through said step b) reading light obtained in the light-source switched-off condition; and e) correcting the processed image data obtained through said step b) reading light data of light reflected by an original image in the light-source switched-on condition, the correcting operation using the processed image data obtained through said step b) reading light data of light obtained in the light-source switched-off condition, the used processed image data being the processed image data having been stored in said step d).

10. An image reading method comprising the steps of:

a) applying, with a light source, light onto either a reference white board or an original image, said reference white board or said original image thus reflecting the applied light;

b) detecting the temperature of said light source;

c) converting a value of the temperature of said light source into a corresponding illuminance value, said temperature being the temperature detected in said step b) in a light-source switched-off condition;

d) receiving, with a photoelectric converting means, and storing therein any one of the light reflected by said reference white board, the light reflected by said original image, and light obtained in the light-source switched-off condition, said photoelectric converting means converting the thus stored light into corresponding image signals, said step d) further comprising a step d-1) processing said image signals using control values to obtain processed image data, thus said step d) reading light data of any of the light reflected by said reference white board and the light reflected by said original image in a light-source switched-on condition, and the light obtained in the light-source switched-off condition;

said step d) reading the light data of the light reflected by said reference white board in the light-source switched-on condition before reading the light data of the light reflected by an original image in the light-source switched-on condition;

e) setting values as the control values to be used for current reading operations of said step d);

said step e) setting a control value dependent on the illuminance value obtained through said step c) as the control value to be used for a current reading operation of said step d) if said current reading operation of said step d) is carried out in the light-source switched-off condition;

said step e) setting a predetermined reference value an the control value to be used for a current reading operation of said step d) if said current reading operation of said step d) reads light data of light reflected by said reference white board in the light-source switched-on condition;

said step e) setting a certain value as the control value to be used for a current reading operation of said step d) if said current reading operation of said step d) reads light data of light reflected by an original image in the light-source switched-on condition, said certain value dependent on the processed image data obtained through said step d) reading said reference white board before said current reading operation of said step d);

f) storing the processed image data obtained through said step d) reading light obtained in the light-source switched-off condition; and g) correcting the processed image data obtained through said step d) reading light data of light reflected by an original image in the light-source switched-on condition, the correcting operation using the processed image data obtained through said step d) reading light data of light obtained in the light-source switched-off condition, the used processed image data being the processed image data having been stored in said step f).

11. An image reading method comprising the steps of:

a) applying, with a light source, light onto either a reference white board or an original image, said reference white board or said original image thus reflecting the applied light;

b) detecting the temperature of said light source;

c) converting a value of the temperature of said light source into a corresponding illuminance value, said temperature being the temperature detected by said step b) in a light-source switched-off condition;

d) receiving, with a photoelectric converting means, and storing therein any one of the light reflected by said reference white board, the light reflected by said original image, and light obtained in the light-source switched-off condition, said photoelectric converting means converting the thus stored light into corresponding image signals, said step d) further comprising a step d-1) processing said image signals using control values to obtain processed image data, thus said step d) reading light data of any of the light reflected by said reference white board and the light reflected by said original image in a light-source switched-on condition, and the light obtained in the light-source switched-off condition;

said step d) reading the light data of the light reflected by said reference white board in the light-source switched-on condition before reading the light data of the light reflected by an original image in the light-source switched-on condition;

e) determining whether a current reading operation performed in said step d) is one of a successive plurality of reading operations;

if said step e) has determined that said current reading operation is one of said successive plurality of reading operations, said step e) further determining whether said current reading operation is the first one of said successive plurality of reading operations;

f) setting values as the control values to be used for current reading operations of said step d);

either if a current reading operation performed in said step d) is determined by said step e) to be one of a successive plurality of reading operations or if a current reading operation performed in said step d) is determined by said step e) not to be one of said successive plurality of reading operations;

said step f) setting a control value dependent on the illuminance value obtained through said step c) as the control value to be used for a current reading operation of said step d) if said current reading operation of said step d) is carried out in the light-source switched-off condition;

said step f) setting a predetermined reference value as the control value to be used for a current reading operation of said step d) if said current reading operation of said step d) reads light data of light reflected by said reference white board in the light-source switched-on condition;

said step f) setting a certain value as the control value to be used for a current reading operation of said step d) if said current reading operation of said step d) reads light data of light reflected by an original image in the light-source switched-on condition, said certain value dependent on the processed image data obtained through said step d) reading said reference white board before said current reading operation of said step d);

if the current reading operation performed in said step d) is determined by said step e) to be one of but not to be the first one of successive plurality of reading operations;

said step f) setting the control value used in a preceding operation of said step d) as the control value to be used for a current reading operation of said step d) if said current reading operation of said step d) is carried out in the light-source switched-off condition, said preceding operation of said step d) being an operation reading light data of light reflected from an original image in the light-source switched-on condition;

said step f) setting a predetermined reference value as the control value to be used for a current reading operation of said step d) if said current reading operation of said step d) reads light data of light reflected by said reference white board in the light-source switched-on condition;

said step f) setting a certain value as the control value to be used for a current reading operation of said step d) if said current reading operation of said step d) reads light data of light reflected by an original image in the light-source switched-on condition, said certain value dependent on the processed image data obtained through said step d) reading said reference white board before said current reading operation of said step d);

g) storing the processed image data obtained through said step d) reading light obtained in the light-source switched-off condition; and h) correcting the processed image data obtained through said step d) reading light reflected by an original image in the light-source switched-on condition, the correcting operation using the processed image data obtained through said step d) reading light data of light obtained in the light-source switched-off condition, the used processed image data being the processed image data having been stored in said step g).

* * * * *